United States Patent
Klein et al.

(10) Patent No.: US 12,546,501 B2
(45) Date of Patent: Feb. 10, 2026

(54) SYSTEM, METHOD AND COMPUTER PROGRAM PRODUCT FOR IMPROVED CLIMATE CONTROL

(71) Applicant: Wall to Wall, LLC, Hayward, CA (US)

(72) Inventors: Alon Klein, Herzliya (IL); Binyamin Gil, Rehovot (IL); Mati Matityahu Aharonyan, Petakh Tikva (IL); Israel Jay Klein, Kfar Saba (IL); Shai Shachrur, Givat Ela (IL)

(73) Assignee: Wall to Wall, LLC, Hayward, CA (US)

( * ) Notice: Subject to any disclaimer, the term of this patent is extended or adjusted under 35 U.S.C. 154(b) by 504 days.

(21) Appl. No.: 18/247,173

(22) PCT Filed: Sep. 19, 2021

(86) PCT No.: PCT/IL2021/051138
§ 371 (c)(1),
(2) Date: Mar. 29, 2023

(87) PCT Pub. No.: WO2022/070180
PCT Pub. Date: Apr. 7, 2022

(65) Prior Publication Data
US 2023/0375207 A1    Nov. 23, 2023

Related U.S. Application Data

(63) Continuation-in-part of application No. 17/212,317, filed on Mar. 25, 2021, now abandoned.
(Continued)

(30) Foreign Application Priority Data

Sep. 30, 2020    (IL) .......................................... 277709

(51) Int. Cl.
*F24F 11/64*    (2018.01)

(52) U.S. Cl.
CPC .................................. *F24F 11/64* (2018.01)

(58) Field of Classification Search
CPC ........ F24F 11/64; F24F 11/0008; F24F 11/62; F24F 11/65; F24F 11/30; F24F 2110/10; F24F 2110/20
See application file for complete search history.

(56) References Cited

U.S. PATENT DOCUMENTS

| | | |
|---|---|---|
| 4,519,217 A | 5/1985 | Phillips et al. |
| 6,070,110 A | 5/2000 | Shah et al. |

(Continued)

FOREIGN PATENT DOCUMENTS

| | | |
|---|---|---|
| FR | 3 085 696 A1 | 3/2020 |
| IT | 202000018862 A1 | 1/2022 |

(Continued)

OTHER PUBLICATIONS

Aharonyan et al., U.S. Office Action dated Aug. 3, 2022, directed to U.S. Appl. No. 17/212,317; 28 pages.
(Continued)

*Primary Examiner* — Mohammad Ali
*Assistant Examiner* — Vincent W Chang
(74) *Attorney, Agent, or Firm* — Morrison & Foerster LLP

(57) ABSTRACT

Controller apparatus operative in conjunction with a climate control system including at least first and second climate control elements, the controller apparatus comprising a hardware processor providing hysteresis coupling between the at least first and second climate control elements, including providing at least one first hysteresis plan controlling the first climate control element, and at least one second hysteresis plan controlling the second climate control element. The first and second hysteresis plans each have at least one parameter, and at least one parameter of the second hyster-
(Continued)

esis plan is/are coupled to at least one parameter of the first hysteresis plan by computing the at least one parameter/s of the second hysteresis plan as a function of at least one parameter/s of the first hysteresis plan.

16 Claims, 24 Drawing Sheets

Related U.S. Application Data

(60) Provisional application No. 63/088,029, filed on Oct. 6, 2020.

(56) References Cited

U.S. PATENT DOCUMENTS

| | | | |
|---|---|---|---|
| 11,674,709 | B2 | 6/2023 | Hiroishi et al. |
| 2006/0186214 | A1 | 8/2006 | Simon et al. |
| 2007/0168084 | A1 | 7/2007 | Cheng |
| 2008/0086981 | A1 | 4/2008 | Kilkis et al. |
| 2008/0223547 | A1 | 9/2008 | Chahed |
| 2011/0256822 | A1 | 10/2011 | Carlson |
| 2014/0326796 | A1* | 11/2014 | Kymissis ........... G05D 23/1905 237/79 |
| 2015/0134122 | A1 | 5/2015 | Modi et al. |
| 2016/0258642 | A1 | 9/2016 | Cheatham, III et al. |
| 2017/0003172 | A1 | 1/2017 | Maes et al. |
| 2017/0336815 | A1 | 11/2017 | Smith, Jr. |
| 2018/0073930 | A1 | 3/2018 | Meggers et al. |
| 2018/0106491 | A1* | 4/2018 | Abrishamkar ............ F24F 1/68 |
| 2019/0086106 | A1* | 3/2019 | Okita ...................... F24F 11/62 |
| 2019/0186133 | A1 | 6/2019 | Scherrer et al. |
| 2020/0003408 | A1* | 1/2020 | Haaf ........................ F21S 8/04 |
| 2020/0292197 | A1 | 9/2020 | Wilson et al. |

FOREIGN PATENT DOCUMENTS

| | | |
|---|---|---|
| JP | 8-94111 A | 4/1996 |
| JP | 2016061484 A | 4/2016 |
| JP | 2017-180905 A | 10/2017 |
| WO | 2018/037471 A1 | 3/2018 |
| WO | 2022023899 A1 | 2/2022 |

OTHER PUBLICATIONS

Aharonyan et al., U.S. Office Action dated Feb. 2, 2022, directed to U.S. Appl. No. 17/212,317; 23 pages.
Aharonyan et al., U.S. Office Action dated Mar. 31, 2023, directed to U.S. Appl. No. 17/212,317; 34 pages.
Aharonyan et al., U.S. Office Action dated Oct. 23, 2023, directed to U.S. Appl. No. 17/212,317; 39 pages.
Delaney, J. R. (Apr. 20, 2022). "The Best Smart Thermostats for 2022," located at https://www.pcmag.com/picks/the-best-smart-thermostats. (22 pages).
Delaney, J. R. (Apr. 28, 2023). "The Best Smart Thermostats for 2023," located at https://www.pcmag.com/picks/the-best-smart-thermostats. (23 pages).
Extended European Search Report dated Aug. 5, 2024, directed to EP Application No. 21874729.3; 8 pages.
International Preliminary Report on Patentability dated Mar. 28, 2023, directed to International Application No. PCT/IL2021/051111; 6 pages.
International Search Report and Written Opinion dated Feb. 6, 2022, directed to International Application No. PCT/IL2021/051111; 8 pages.
Justia Patents Search (Jun. 2022). "Specific Thermally Responsive Controller Patents." (25 pages).
Notice of Deficiencies dated Oct. 15, 2024, directed to Israeli Application No. 277709; 5 pages.
Shachrur et al., U.S. Office Action dated Feb. 27, 2025, directed to U.S. Appl. No. 18/247,167; 20 pages.
Centralised Control System, https://aircon.panasonic.com/business/lineup/controller/centralised.html, May 8, 2021, pp. 1-2.
Almesri, et al., An air distribution index for assessing the thermal comfort and air quality in uniform and nonuniform thermal environments. Indoor and built environment, 22(4):618-639 (Aug. 2013).
Cibse, E. D. (2015). CIBSE Guide A: Environmental Design, Chart. Inst. Build. Serv. Eng. London, 2015, pp. 1-100.
10 Best Climate Control Appliances to Make Your Home Smart!, https://www.cielowigle.com/blog/10-best-smart-home-climate-controlappliances, Apr. 17, 2021, pp. 1-22.
"Can I use Both Air Conditioner and Ceiling Fan Together?" [FAQ], https://www.coolray.com/help-guides/can-i-use-both-air-conditioner-andceiling-fan-together-faq, Jul. 10, 2021, pp. 1-5.
Detmer and Sons, Troubleshooting Your Air Conditioner, https://www.detmersons.com/troubleshooting-your-air-conditioner, Sep. 16, 2016, pp. 1-2.
Detmer and Sons, What Do You Know About Smart HVAC Systems?, https://www.detmersons.com/what-do-you-know-about-smart-hvacsystems, Sep. 22, 2016, pp. 1-2.
Ekici, Can, A review of thermal comfort and method of using Fanger's PMV equation, In 5th International Symposium on Measurement, Analysis and Modelling of Human Functions, ISHF, Jun. 27-29, 2013, pp. 61-64.
How Engineers are Using Electric Heat to Improve IAQ, https://electricheat.com/trends/, 2023, pp. 1-7.
Products, https://web.archive.org/web/20210805065030/https://electricheat.com/products, Aug. 5, 2021, pp. 1-3.
Megatrends for Engineers & Industry Professionals, https://electricheat.com/trends/improving-indoor-air-quality, Jun. 17, 2021, pp. 1-8.
Should You Run an Air Conditioner & Ceiling Fan Together?, https://homeguides.sfgate.com/should-run-air-conditioner-ceiling-fantogether-69173.html Dec. 14, 2018, pp. 1-5.
British, European and international standards relevant to working in thermal environments, Health and Safety Executive, https://www.hse.gov.uk/temperature/assets/docs/british-european-intstandards.pdf, Jul. 15,2021, pp. 1.
Thermal comfort checklist, Health and Safety Executive, https://www.hse.gov.uk/temperature/assets/docs/thermal-comfortchecklist.pdf, Jul. 21, 2021, p. 1.
Klepeis, et al., The National Human Activity Pattern Survey (NHAPS): A Resource for Assessing Exposure to Environmental Pollutants, Journal of Exposure Analysis and Environmental Epidemiology, 11:231-252 (2001).
Use Fans with Air Conditioning to Boost the Cooling Effect, https://www.lasko.com/use-fans-with-air-conditioning-to-boost-the-coolingeffect, Sep. 26, 2018, pp. 1-4.
Delaney, John R, The Best Smart Thermostats for 2023, PCMag, https://www.pcmag.com/picks/the-best-smart-thermostats. Aug. 31, 2021, pp. 1-23.
Radiant Panels, Inc., https://www.radiantpanels.com, Dec. 19, 2021, p. 1.
https://sensibo.com/products/sensibo-air-bundle#:~:text=FAQ-,Specifications,-Reviews, Aug. 18, 2021, pp. 1-4.
Specific Thermally Responsive Controller Patents and Patent Applications—Justia Patents Search, retrieved on Jun. 7, 2022, pp. 1-25.
Maury Tiernan, "Two or More HVAC Units, One Thermostat", The Comfort Zone, Geary Pacific Corp. Sep./Oct. 2000, pp. 1-2.
What's the optimal way to combine a fan with an air conditioner?, Ask MetaFilter, May 30, 2006, pp. 1-6.
Wikipedia, ASHRAE55, https://en.wikipedia.org/wiki/ASHRAE_55, Jan. 25, 2021, pp. 1-9.
Wikipedia, Thermostat, https://en.wikipedia.org/wiki/ASHRAE_55, Jan. 25, 2021, pp. 1-13.

* cited by examiner

Plans before modificition          Plans after modificition

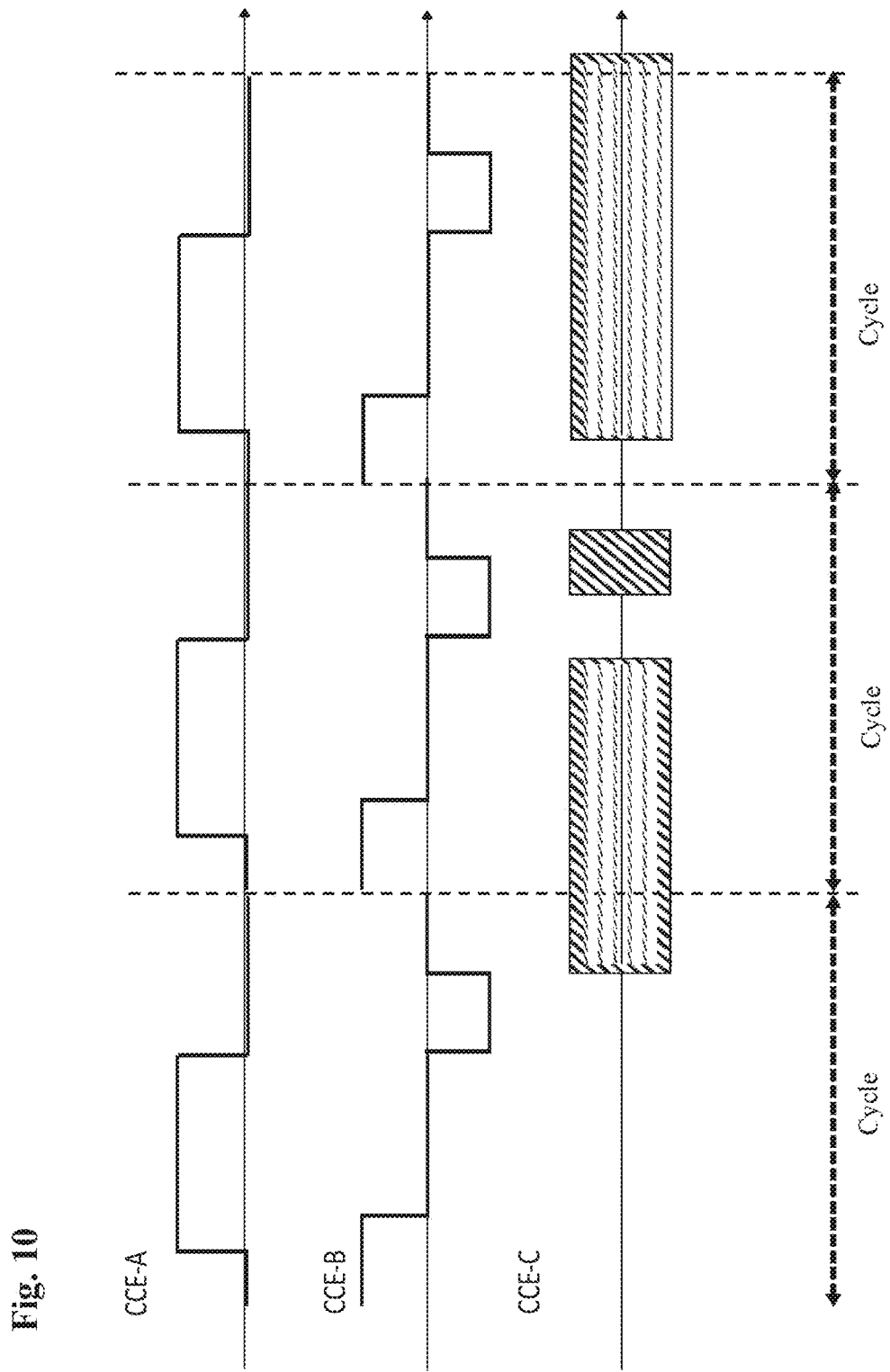

Fig. 11

| Di>Dmax | Ci<Cmin | Fault | Type |
|---|---|---|---|
| N | N | N | Other CCE in the group may be over utilized, moderate modification required |
| N | Y | Y | Other CCE in the group may be over utilized and if so, significant modification is required |
| Y | N | Y | CCEj is over utilized, moderate modifications required |
| Y | Y | Y | CCEj is over utilized, significant modification required |

Fig. 12

| Di>Dmax | Ci<Cmin | Fault | Type |
|---|---|---|---|
| N | N | N | No changes needed, system operates normally |
| N | Y | Unknown | Other CCE in the group may be over utilized and if so, a minor modification is required |
| Y | N | Unknown | CCEj is over utilized, minor modifications required |
| Y | Y | Unknown | CCEj is over utilized, minor modification required |

SYSTEM, METHOD AND COMPUTER PROGRAM PRODUCT FOR IMPROVED CLIMATE CONTROL

REFERENCE TO CO-PENDING APPLICATIONS

This PCT application claims priority from U.S. provisional application No. 63/088,029 filed 6 Oct. 2020 and entitled "System, Method And Computer Program Product For Improved Climate Control", and from Israel Patent Application No. 277709 filed 30 Sep. 2020 and entitled "Air convection system", and from U.S. patent application Ser. No. 17/212,317, filed Mar. 25, 2021 and entitled "System, method, and computer program product for human thermal comfort-oriented control of multi system HVAC devices", the disclosures of which applications are hereby incorporated herein by reference.

FIELD OF THIS DISCLOSURE

The present invention relates generally to heating, ventilation, and air conditioning (HVAC), and more particularly to HVAC control.

BACKGROUND FOR THIS DISCLOSURE

Thermal comfort and thermal risk are described here: https://www.hse.gov.uk/temerature/assets/docs/british-european-int-standards.pdf.

'Thermal comfort' is a subjective measure of whether a person feels comfortable, too hot, or too cold, in a given space. Thermal comfort is determined by environmental factors (e.g. humidity, sources of heat in a given space), and by personal factors (e.g. a person's clothing and how physically demanding a person's current activity level is).

Thermal comfort may be assessed using a checklist (https://www.hse.gov.uk/temperature/assets/docs/thermal-comfort-checklist.pdf) or the online government publication at this https: www link: hse.gov.uk/temperature/thermal/factors.htm which describes that environmental factors affecting thermal comfort may include air temperature, which is the most common indicator of thermal comfort, radiant temperature, air velocity and humidity or relative humidity, whereas personal factors affecting thermal comfort may include clothing, insulation, and metabolic heat.

Air temperature, the temperature of the air surrounding a person, may be given in degrees Celsius (° C.). Radiant temperature measure thermal radiation, the heat that radiates from an object such as the sun, fire, oven or other cooker, dryer, a hot object or surface e.g. of machinery, or other heat source, which, even more so than air temperature, influences the extent to which people lose or gain heat to their environment.

Air velocity describes the speed of air moving across a person; if the air is cooler than the environment, the air's velocity may help cool the person. In contrast, still air in a heated environment may cause people to feel uncomfortably stuffy. Moving air in a warm and/or humid environment may increase heat loss through convection, even without a change in air temperature. Physical activity increases air movement. Minor air movements in cool/cold environments may be experienced as a draught, and cause discomfort.

Water which has been heated and evaporated, results in water present in the air or humidity. Relative humidity, the ratio between the amount of water vapour present in air at temperature T and the maximum amount of water vapour that air of air temperature T can hold, may affect thermal comfort. Relative humidity between 40% and 70% hardly affects thermal comfort, but relative humidity higher than 70% may affect thermal comfort. High humidity, e.g. a large % of vapour in the air, prevents evaporation of sweat. Thus, in hot environments, less sweat evaporates when humidity is over 80%+, which may detract from thermal comfort, since sweat evaporation is the human body's main way of achieving heat reduction. Non-breathable vapour-impermeable personal protective equipment (PPE) causes humidity inside the wearer's garment to increase, since the wearer sweats, but the sweat cannot evaporate.

Wearing too much clothing or PPE may cause heat stress, whereas clothing which provides insufficient insulation leaves the wearer at risk from frostbite or hypothermia, if the environment is cold. While adding clothing, if cold, and removing clothing, if warm, enhances thermal comfort, this may be impossible e.g. for employees bound by a dress code.

Work rate/metabolic heat are relevant because a person doing physical work produces heat. Such a person needs to lose heat to prevent becoming overheated.

Metabolic rate impacts thermal comfort and varies between people. A person's physical characteristics may be related to their thermal comfort, e.g. persons in the same space with known air temperature, humidity and air velocity, may vary in the thermal comfort they experience as a function of at least one of the following factors: the person's size, weight, age, fitness level, and gender.

Thermostats with hysteresis are known. For example, Wikipedia's entry of thermostats (https://en.wikipedia.org/wiki/Thermostat) describes that "To prevent excessively rapid cycling of the equipment when the temperature is near the setpoint, a thermostat can include some hysteresis . . . . To improve the comfort of the occupants of heated or air-conditioned spaces, bimetal sensor thermostats can include an "anticipator" system to slightly warm the temperature sensor while the heating equipment is operating, or to slightly warm the sensor when the cooling system is not operating" which "reduces the magnitude of temperature variations. Electronic thermostats have an electronic equivalent." Typically, if a temperature T is desired, a compressor may be turned off only when temperature T has been exceeded by, say, half a degree, and may be turned back on only when the temperature has fallen at least half a degree below temperature T.

It is known, e.g. from this online publication: https://electricheat.com/trends/improving-indoor-air-quality/, that "Traditionally, HVAC systems were designed first with thermal comfort in mind, then efficiency . . . . [B]uildings were designed to be more airtight to increase comfort and decrease heat and energy losses. While getting rid of drafty doors led to more comfortable spaces and less stress on HVAC systems, it also led to poor air quality in buildings."

Also, it is known (e.g. from this online publication: https://electricheat.com/trends/) that "Conventional methods of heating and cooling increase air circulation but contribute to poor indoor air quality" and that "supplementing or replacing a traditional HVAC system with a radiant heating system can improve indoor air quality and decrease the risk of airborne infection".

Using an air conditioner in conjunction with a fan, to achieve thermal comfort, is known e.g. from the following online publications:
https://www.lasko.com/use-fans-with-air-conditioning-to-boost-the-cooling-effect/
which describes how a fan might be tilted, and positioned;

and https://ask.metafilter.com/39177/Whats-the-optimal-way-to-combine-a-fan-with-an-air-conditioner and, re ceiling fans—
https://www.coolray.con/help-guides/can-i-use-both-air-conditioner-and-ceiling-fan-together-faq
and
https://homeguides.sfgate.com/should-run-air-conditioner-ceiling-fan-together-69173.html Climate control appliances are known and are reviewed here:
https://www.cielowigle.com/blog/10-best-smart-home-climate-control-appliances/

Smart thermostats are known and are reviewed here: https://www.pcmag.com/nicks/the-best-smart-thermostats.

Smart HVAC systems are known. One online resource (https://www.detmersons.com/what-do-you-know-about-smart-hvac-systems/) describes "a smart HVAC system (which can) give homeowners more control over comfort. The system adjusts intuitively or remotely to match your preference and needs. You can control the system using your smartphone. Components that can make your simple HVAC system smarter include an optimized compressor and air handler, sensor-driven ventilation and air supply, and a smart thermostat . . . . Most intelligent HVAC systems use smart thermostats, smart meters, and a smartphone-enabled app. A smart thermostat adjusts room temperature based on factors like current room temperature, humidity, and occupancy. A system with smart sensors can monitor external sources as well as interior functionality to maintain efficiency. Smart vents allow you to turn off vents in unoccupied rooms . . . . The smartphone app gives you the convenience of controlling your heating and cooling remotely . . . . Smart HVAC systems feature . . . real-time management of different aspects of home comfort. This helps you control energy consumption and save on heating and air conditioning costs . . . ."

Using one thermostat to control two or more HVAC units, is known, e.g. from this online source: http://www.modular.org/HtmlPage.aspx?name=comfort9_00

The disclosures of all publications and patent documents mentioned in the specification, and of the publications and patent documents cited therein directly or indirectly, are hereby incorporated by reference, other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

A controllable air conditioner platform by Panasonic is described inter alia here: https://aircon.panasonic.com/business/lineup/controller/centralised.html Sensibo's add on to an existing air conditioner which yields a conventional thermal comfort appliance which is electrically controllable is described inter alia here: https://sensibo.com/products/sensibo-air-bundle#:~:text=FAQ-,Specifications,-Reviews and has smart features such as setting temperature limits.

SUMMARY OF CERTAIN EMBODIMENTS

Certain embodiments of the present invention seek to provide circuitry, typically comprising at least one hardware processor in communication with at least one memory, with instructions stored in such memory executed by the processor to provide functionalities which are described herein in detail. Any functionality described herein may be firmware-implemented, or processor-implemented, as appropriate.

At least the following example implementations are included in the scope of the present invention, stand-alone, or in combination with the claimed embodiments:

Example 1. A method (or system or computer program product) for controlling climate in a space, the method comprising: deploying plural climate control elements in the space; and/or controlling the plural climate control elements to yield, together, thermal comfort in the space.

Example 2. The method (or system or computer program product) of any preceding example wherein said controlling yields coupling between plural program settings.

Example 3. The method (or system or computer program product) of any preceding example wherein said controlling yields coupling of CCE ongoing program activity with environmental and operational changes.

Example 4. The method (or system or computer program product) of any preceding example wherein said controlling yields trigger based coupling of ongoing program activity.

Example 5. The method (or system or computer program product) of any preceding example wherein said controlling yields coupled hysteresis settings.

Example 6. The method (or system or computer program product) of any preceding example wherein said controlling yields switchable hysteresis plans.

It is appreciated that any known solution may be employed to render the plans switchable, such as but not limited to a physical switch e.g. in a controller, or a configuration file/plan in the controller, for a software implementation of the hysteresis plan switching.

Example 7. The method (or system or computer program product) of any preceding example wherein said controlling yields synchronous and asynchronous control.

Example 8. The method (or system or computer program product) of any preceding example wherein duty cycle/s of climate control element/s is/are measured and/or wherein a duty cycle is used as an indicator for hysteresis plan mismatch.

Example 9. The method (or system or computer program product) of any preceding example wherein variables indicating whether a target operational point is met are monitored, and, responsively, at least one CCE program is updated.

Example 10. The method (or system or computer program product) of any preceding example wherein operational duty cycles and/or cycle durations are monitored, and, responsively, at least one CCE program is updated.

Example 11. The method (or system or computer program product) of any preceding example wherein said updating includes tuning, updating or replacing at least one hysteresis plan.

Example 12. The method (or system or computer program product) of any preceding example and wherein, for each CCE intended for a hysteresis plan, at least two plans are maintained, one for a normal operation mode, and at least one additional plan used during a modification mode.

Example 13. The method (or system or computer program product) of any preceding example wherein hysteresis plans are coupled, no matter how the coupling was achieved.

Example 14. Processing circuitry comprising at least one processor and at least one memory and configured to perform at least one of or any combination of the described operations, or to execute any combination of the described modules.

At least one embodiment of this invention is useful for multiple climate control elements which are deployed within some bounded area or confined space. At least one embodiment of this invention provides systematic coordinated control between multiple climate control elements and/or provides thermal comfort (within the area of deployment) and/or some other holistic operational criteria (e.g., minimizing energy consumption and/or maintaining zero-sum air flow pressure, etc.). The elements in use can be somewhat identical in nature (e.g., all fans) or of mixed types (e.g., some fans, air conditioners, radiant panels, etc.). The elements in use can be, on one hand, single-function providers by nature (e.g., a fan which provides air flow with no additional features), or, on the other hand, complex elements which provide multi-functional capabilities (e.g., an air conditioner which includes both a fan and a heat pump for either heating up or cooling down air).

Problem(s) that at least one embodiment of this invention solves include:
More than one climate control element (e.g., (various types of) fans, air conditioners, radiant panels, etc.) can be deployed within some given bounded area (e.g., bedroom or other room or chamber). Operating all of these elements together, independently, within the same area, not only may lead to energy waste (e.g., no need for all elements to operate for achieving some air temperature), but can actually degrade performance. For example, operating a fan which blows air against the air flow of an air conditioner located in the same room, may create air turbulence and reduce the capability of the air conditioner to equalize the temperatures over the room correctly. This could also be the case when choosing wrongly—preferring the use of one element instead of another which is a better choice for certain scenarios, for example, choosing only radiant panels for fast cooling of a hot room, while overlooking the installed air conditioner, which, if activated, can change the climate conditions much faster.

The climate control elements may be part of a complete system which needs some form of centralized control (e.g., synchronization). This could be the case of several air vents within the same room for which some holistic air flow pressure considerations may take place e.g. to ensure that air flow and/or air pressure in each room is within a (typically pre-determined or pre-stored parameter) safe range, or several radiant panels (e.g., over the walls and/or floor), available e.g. from https://electricheat.com/products/ and/or from https://www.radiantpanels.com/, which are grouped together for generating some focused heating (or cooling) capabilities within a specific zone (a specific region within the complete given area).

Certain embodiments seek to provide a controller which resolves all or any subset of the following problems:
a. Energy budget mismatch—the operational choices and preferences of climate control elements lead to energy consumption levels being either too high or too low for some given thermal conditions; the system may be too powerful or too weak for the given scenario. For example, an air conditioner may be used to maintain overall temperature instead of using localized elements for providing pin point thermal comfort.
b. Sub optimal set-up—the operational choices and preferences of climate control elements may lead to performance degradation due to elements contradicting one another in their operational method, and/or by setting their preferences incorrectly (e.g., choosing the wrong elements at a specific time for a certain operational task), or selecting them unfittingly. example: relying on a radiant panelized system for quick thermal changes instead of using an air conditioner element if operating together in the same area.
c. Mission critical functions—the operational choices and preferences of climate control elements of a system may be selected and operated only in some predefined manner for assuring appropriate operation; if not selected or set correctly, then the system functions may be significantly harmed. example: 2 fans operating one against the other creating turbulence and reducing overall air circulation within the room.

At least one embodiment of the invention is an improvement over existing technology for at least the following reasons.

Multiple climate control elements are a common scenario for a complete house, apartment, office space etc. In this case, although many elements are deployed, they are, conventionally, autonomously operated, each element handling a specific room or some other confined area, each element set up, independently one from each other.

In the case of a single room (or some other confined area) with multiple climate control elements deployed within, permitting each element to operate independently prevents all elements from working as a complete or cooperative system and may detract from achieving operational target/s (e.g., a certain desired air temperature and/or relative humidity and/or air pressure), optimizing performance, or from even just functioning properly.

At least one embodiment of the invention seeks to enhance all or any subset of:
1) Energy Budget Matching—at least one embodiment of the invention allows for operational programs which activate the climate control elements to correctly balance the cooling or heating performance as required by the current scenario. Different elements may be programmed in a timely manner enabling certain elements to operate using one setting or configuration in some certain periods of time, while changing their setting or configuration in other period of time (e.g., reducing cooling time).
2) Optimal Set-up—at least one embodiment of the invention facilitates operation programs which take into consideration different aspects of different climate control elements, such as performance, capabilities and physical characteristics. Such embodiments typically prevent situations in which certain elements may operate in a contradicting (e.g., fans blowing one at each other) or in an ineffective way (e.g., excessive use or operation of multiple elements) and selects proper combination settings for optimized function.
1. Mission Critical Operation—at least one embodiment of the invention supports the operation of multiple elements which may be only activated and set up in some predefined manner, assuring proper function and protecting the system (the complete climate control elements set up) from misuse and damage.

At least one embodiment of this invention may be useful for, though not limited to, climate control system manufacturers, construction companies, contractors, MEP engineers, architects, interior designers etc.

Benefits to users may include but not limited to all or any subset of:

1) Energy Budget Matching—The user's thermal comfort level may be achieved with a minimal energy investment for various climate control scenarios, which are either affected by weather or indoor desires. The system's adjustment time to scenario changes may be minimal.
2) Optimal Set-up—The user may experience smooth and enhanced operation as the system performance metrics may be elevated as the utilization and selection of different climate control elements may be optimized.
3) Mission Critical Operation—From a user's perspective, climate control elements which may require considerable tweaking in order to maintain useful operation, are now replaced with an automatic background process which is seamless to the user.
4) Controller may be programmed such that operational errors of complex systems including plural climate control elements are avoided and/or the total reliability of the system is increased and/or the demand for maintenance is decreased.

It is appreciated that any reference herein to, or recitation of, an operation being performed, e.g. if the operation is performed at least partly in software, is intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

The present invention thus typically includes at least the following embodiments:

Embodiment 1. Controller apparatus operative in conjunction with a climate control system including at least first and second climate control elements, the controller apparatus comprising: A hardware processor providing, typically, hysteresis coupling between at least the first and second climate control elements, typically including providing at least one first hysteresis plan controlling the first climate control element, and at least one second hysteresis plan controlling the second climate control element and wherein typically, the first and second hysteresis plans each have at least one parameter; and wherein at least one parameter of the second hysteresis plan is coupled to at least one parameter of the first hysteresis plan by computing the at least one parameter of the second hysteresis plan as a function of at least one parameter of the first hysteresis plan.

Embodiment 2. Controller apparatus according to any of the preceding embodiments wherein the first and second hysteresis plans each include all or any subset of the parameters: (x,s,P0,P1), where x is a sensed, measured or computed aspect, s is an internal hysteresis plan state, P0 is a program controlling a climate control element which is activated when s=0, P1 is a program controlling the climate control element which is activated when s=1.

Embodiment 3. Controller apparatus according to any of the preceding embodiments wherein the first and second hysteresis plans each have at least one hysteresis parameter and wherein at least one parameter of the second hysteresis plan is computed as a function of at least one parameter of the first hysteresis plan.

Embodiment 4. Controller apparatus according to any of the preceding embodiments and wherein the hysteresis parameter includes at least one of: a threshold center, an upper threshold, a lower threshold, at least one hysteresis gap parameter between the threshold center and at least one of an upper threshold and a lower threshold.

Embodiment 5. Controller apparatus according to any of the preceding embodiments wherein x comprises a measurement generated by a single sensor of an aspect such as current relative humidity.

Embodiment 6. Controller apparatus according to any of the preceding embodiments wherein x comprises a combination of plural sensor measurements of at least one aspect at at least one time.

Embodiment 7. Controller apparatus according to any of the preceding embodiments wherein the hardware processor is configured for detection of inefficiency of a current hysteresis program that is currently governing operation of a given climate control element and wherein, on at least one occasion in which inefficiency is detected, at least one of the first and second hysteresis plans is replaced by at least one new hysteresis plan, thereby to modify the hysteresis program that is currently governing operation of the given climate control element.

Embodiment 8. Controller apparatus according to any of the preceding embodiments and wherein the new hysteresis plan is coupled to at least one parameter of a hysteresis plan currently governing operation of a climate control element other than the given climate control element.

Embodiment 9. Controller apparatus according to any of the preceding embodiments and wherein the detection of inefficiency comprises detection of inability to maintain a target goal for at least one aspect.

Embodiment 10. Controller apparatus according to any of the preceding embodiments wherein the target goal for at least one aspect comprises a target temperature and/or target humidity and/or target air pressure, that is/are to be maintained.

Embodiment 11. Controller apparatus according to any of the preceding embodiments wherein at least one decision to replace a hysteresis plan with a new plan, is made responsive to measurement/s of duty cycle.

Embodiment 12. Controller apparatus according to any of the preceding embodiments wherein at least one decision to replace a hysteresis plan with a new plan, is made responsive to measurement/s of cycle time/s.

Embodiment 13. Controller apparatus according to any of the preceding embodiments wherein at least one thermal comfort physical aspect is maintained by providing synchronization between at least a subset of plural climate control elements which affect the physical aspect.

Embodiment 14. Controller apparatus according to any of the preceding embodiments wherein the physical aspect to be maintained comprises net zero air pressure over plural spaces between which air flows when the plural climate control elements operate.

Embodiment 15. Controller apparatus according to any of the preceding embodiments wherein at least one of the first and second hysteresis plans also provides the synchronization.

Embodiment 16. A method for controlling a climate control system including at least first and second climate control elements, the method comprising:

Providing a hardware processor which provides hysteresis coupling between at least the first and second climate control elements, including providing at least one first hysteresis plan controlling the first climate control element, and at least one second hysteresis plan controlling the second climate control element and wherein the first and second hysteresis plans each have at least one parameter; and coupling at least one parameter of the second hysteresis plan to at least one parameter of the first hysteresis plan by computing the at least one parameter of the second hysteresis plan as a function of at least one parameter of the first hysteresis plan.

Embodiment 17. A computer program product, comprising a non-transitory tangible computer readable medium having computer readable program code embodied therein, the computer readable program code adapted to be executed to implement a method for controlling a climate control system including at least first and second climate control elements, the method comprising:

Providing a hardware processor which provides hysteresis coupling between at least the first and second climate control elements, including providing at least one first hysteresis plan controlling the first climate control element, and at least one second hysteresis plan controlling the second climate control element and wherein the first and second hysteresis plans each have at least one parameter; and coupling at least one parameter of the second hysteresis plan to at least one parameter of the first hysteresis plan by computing the at least one parameter of the second hysteresis plan as a function of at least one parameter of the first hysteresis plan.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes, or a general purpose computer specially configured for the desired purposes by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules illustrated and described herein may include any one or combination or plurality of: a server, a data processor, a memory/computer storage, a communication interface (wireless (e.g. BLE) or wired (e.g. USB)), a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program, such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs), or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate or route, or otherwise manipulate or process information as described herein and/or to perform functionalities described herein and/or to implement any engine, interface or other system illustrated or described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein, which may, for example, include all or any subset of an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface or "UI" as used herein includes also the underlying logic which controls the data presented to the user e.g. by the system display and receives and processes and/or provides to other modules herein, data entered by a user e.g. using her or his workstation/device.

BRIEF DESCRIPTION OF THE DRAWINGS

Example embodiments are illustrated in the various drawings. Certain embodiments of the present invention are illustrated in the following drawings; in the block diagrams, arrows between modules may be implemented as APIs and any suitable technology may be used for interconnecting functional components or modules illustrated herein in a suitable sequence or order e.g. via a suitable API/interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Specifically:

FIG. 10 illustrates an example of three CCEs, two of them synchronized, while the third operates independently asynchronously;

FIGS. 11, 12 are tables useful in understanding certain embodiments;

Figure 1A:
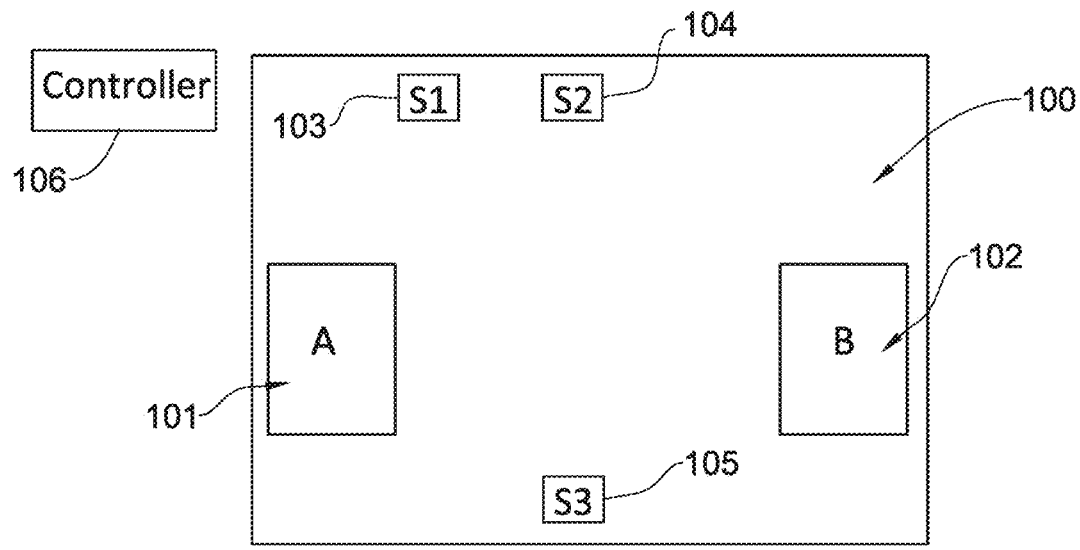
FIG. 1a illustrates a climate control system implemented in a confined space, including a controller and several climate control elements and sensors. While air conditioner controllers and thermostats with hysteresis are of course known, the controller in embodiments herein typically does not emerge from production as a black box in which, once the controller leaves the factory, the controller (nor its user) has no way to dynamically redefine what will be communicated to each climate control element, and when. Instead, even after the controller leaves the factory, the controller may be configured to redefine, dynamically, what will be communicated to at least one and more typically to plural climate control elements (typically to all climate control elements in the system), and when, all typically "on the fly" or dynamically e.g. as described herein, using switchable hysteresis plans whose parameters may be determined interdependently e.g. as described herein.

Methods and systems included in the scope of the present invention may include any subset or all of the functional blocks shown in the specifically illustrated implementations by way of example, in any suitable order e.g. as shown. Flows may include all or any subset of the illustrated operations, suitably ordered e.g. as shown. Tables herein may include all or any subset of the fields and/or records and/or cells and/or rows and/or columns described.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may, alternatively, be wholly or fully implemented by an equivalent hardware or firmware module, and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware, in which case all, or any subset of the variables, parameters, and computations described herein, may be in hardware.

Any module or functionality described herein may comprise a suitably configured hardware component or circuitry. Alternatively or in addition, modules or functionality described herein may be performed by a general purpose computer, or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option, such as but not limited to FPGA, ASIC or DSP, or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line, which is of any type or level or amount or category of volatility, differentiation, mutability, accessibility, addressability, capacity, performance and energy use, and which is based on any suitable technologies such as semiconductor, magnetic, optical, paper and others.

DETAILED DESCRIPTION OF CERTAIN EMBODIMENTS

Certain embodiments, e.g. as described herein, provide hysteresis coupling between two different climate control elements, rather than letting the two run freely, independently of one another. Certain embodiments provide coupling between at least one parameter of a first (at least one) hysteresis plan associated with the first climate control element, and at least one parameter of a second (at least one)

hysteresis plan associated with the second climate control element. The coupling provides for updates if and when needed e.g. as described herein in the context of use-case 4. According to certain embodiments, one or both of the two (or N) different climate control elements may switch between plural hysteresis plans associated with a given one of the two (or N) different climate control elements, responsive to a detection of inefficiencies of a current hysteresis plan that is currently governing operation of the given climate control element.

Example: a CCS controller is configured to send climate control programs to climate control elements CCE-A and CCE-B. The CCS controller derives a hysteresis plan e.g. H(x,Q,h,s,P0,P1) for CCE-A. Then, the same CCS controller derives a hysteresis plan e.g. H(y,Q',h',s',R0,R1) for CCE-B where Q'=f(Q,h) and/or h'=g(Q,h) such that at least one parameter of the plan e.g. Q' and/or h' are derived from the CCE-A hysteresis plan, rather than being set independently of the CCE-A hysteresis plan.

Certain embodiments, either standalone or enhancing the above embodiments, provide synchronization between climate control elements. For example, one climate control element may include a ceiling based climate control appliance with multiple openings between a concealed ceiling area and the room beneath the ceiling. A control regime may be provided to allow for precise openings/closings of the ducts of the ceiling based appliance, to yield a desired air flow from a ceiling or a concealed ceiling area to a room, and/or from a room to a ceiling, or to a concealed ceiling area.

Certain embodiments provide multiple, typically electrically controllable, climate control elements which may be deployed within the same bounded area. Certain embodiments provide a systematic approach for coordinated control between such elements while accomplishing some targeted level of thermal comfort (within the area of deployment) or some other holistic operational or functional criteria (e.g., minimal energy consumption, zero-sum air flow pressure, etc.) or any combination of such principles. These elements may include but one type of appliance (e.g., all fans) or may be of mixed types (e.g., some fans, air conditioners, some radiant panels, etc.).

The following terms may be construed either in accordance with any definition thereof appearing in the prior art literature or in accordance with the specification, or to include in their respective scopes, the following:

IAQ=indoor air quality

Thermal Comfort variable)—physical parameters such as environmental factors affecting thermal comfort e.g. air temperature, radiant temperature, air velocity, humidity/relative humidity and/or personal factors affecting thermal comfort e.g. clothing insulation and metabolic heat, which may be used to indicate and predict overall thermal comfort conditions based on past experiments which assessed the subjective evaluation made by a mass of individuals. Typically, for determining the overall thermal comfort condition, a formula or a table, or a set of plots, are used which take into account multiple variables, even though for certain practical operational conditions, a partial set of variables may be used. For example, a fan evacuating air from a bathroom may condition its operation only by the measurement of relative humidity.

Climate Control Element (CCE)—intended to include a device which influences thermal comfort e.g. by affecting one or more of air flow rate, air temperature, relative humidity, and radiation. The device may include control means or a controller for setting various operational parameters such as a fan's speed of rotation or angle or position in the room, or an air conditioner's temperature or slat angle, and may include sensors for monitoring thermal related conditions, such as humidity or air temperature.

Example CCEs include a fan e.g. a ceiling fan, an air conditioner, which may itself include both a fan and a heat pump, window blinds or slats, which selectably let in more/less sunlight, radiant panels, a radiator, and a convection heater aka convector heater aka convector. There may be various types of each of the above, e.g. any of the following are types of convectors: panel heaters, fan heaters, oil heaters aka column heaters, and gas-fired convection heaters. Also, any of the following are types of air conditioners: window air conditioners, air source heat pumps, central air conditioners and ductless air conditioners, also known as a split system or mini-split systems, which are used in spaces with no ductwork. Also, any of the following are types of radiators: convector radiators, panel radiators aka central heating radiators.

The term "climate control element" used herein may include any climate control appliance and/or any (electrically) controllable device which affects thermal comfort and may include plural such appliances or devices.

Examples of off the shelf electrically controllable thermal comfort appliances include Panasonic's controllable air conditioner platform which is described inter alia here: https://aircon.panasi)nic.com/business/lineup/controller/centralised.html
and Sensibo's add on to an existing air conditioner which enables remote control through internet/wifi, which is described inter alia here: https://sensibo.com/products/sensibo-air-bundle #:-:text=FAQ-,Specifications,-Reviews
without the add-on, the existing air conductor may have been controlled via a conventional infra red remote control device, however, with the add-on, the air conditioner (or other thermal comfort appliance) may be electrically controlled e.g. via an app (smart phone, tablet, computer).

Climate Control System (CCS)—intended to include a system which comprises at least one climate control element which may include sensors and in some cases a dedicated controller (e,g. see discussion of Centralized Control herein). The CCS may also include sensors which are not part of the CCEs in the system.

The CCEs may be controlled, e.g. to cooperate with one another to enhance thermal comfort, by a controller which may control any aspect or setting of the CCEs' operation e.g. on/off and/or selecting velocity/rpm (e.g. of a fan's blades) and/or selecting temperature and/or selecting orientation of slats or of blades and/or selecting power. Intervening variables whose values may determine the setting of each CCE may include space factors e.g. the space's temperature and/or humidity and/or occupancy, and/or the state/s of other CCE's.

Program (or climate control program)—the scope of this term is intended to include a set of rules or configuration settings applied to a climate control element whereby the climate control element's operation accommodates for or responds to certain conditions (e.g., turn heater on if room air temperature falls below T degrees, where T is some preset value). In the climate control industry a configuration setting will typically imply a onetime process set-up (e.g., Set X to Y), while a rule will typically imply an ongoing behavioral scheme (e.g., continuously measure X and if X>A then activate a preset plan). The logic (or algorithm), which actually deploys each rule, may be part of an autonomous capability of the CCE or may be tightly coupled with a remote control unit which orchestrates the deployment.

Thus, some CCEs may have an internal controller and the system controller described herein may need to supervise those CCEs less closely than CCEs which lack an internal controller.

The term "program" may include logic which governs each appliance included in a climate control element or system, by determining which mode will each appliance operate in, possibly depending on certain conditions, which may be static or dynamic, and may be environmental but may also be related to or conditional on other system state/s. One example program is logic which controls a climate control element including an airconditioner and a fan, such that the Air Conditioner to operate in low power mode under certain conditions and in high power mode otherwise and the fan always operates in lower power mode. Another example program: If current (air temperature>T1) AND (relative humidity>RH1) then operate air condition at COOL mode else operate air condition at FAN mode. Programs need not necessarily include conditions, for example a program's logic may stipulate "FAN on at level 3 FOREVER" but may include conditions e.g. "IF X THEN Y" and may include complex logical expressions which may include other programs as arguments. For example, given a system with multiple (e.g., N) fans, each having a sensor measuring the ambient air temperature, a program P0 may set fixed parameters for a FAN (P0: FAN ON LEVEL:3). Another program, P1, may be (P1: FAN OFF), and yet another program which may be the main program, P2, may include logic which stipulates that "FOR i=1 to N, Select FAN #i, measure air temperature Ti and IF Ti>T1 then do P0 for Fan #i, else do P1 for Fan #i". Other example programs are described herein.

Duty cycle—intended to include a rectangular pulse waveform parameter which may be associated with operation of a climate controller appliance or component thereof (e.g., fan, compressor). For example, 50% duty cycle means that waveform is "0" (representing an off state) 50% of the cycle and then "1" (representing an on state) 50% of the cycle time. 0% means always off and 100% means always on.

Program send or update—The term "send" may comprise programing the CCE with the corresponding program rules. "Sending" may comprise transporting the program to the CCE (e.g., via ethernet, WiFi) and configuring the CCE accordingly or by a user manually using a control panel). A program "update" may include a modified version of the program which is re-sent to the CCE or may include changes in certain values (e.g., thresholds) with or without the need to re-initialize the program operation itself. The program "update" may be performed by the controller itself due to its own control operation, or responsive to a control update from users or, sensors) or by the CCE intrinsic operation which autonomously reacts to its surroundings.

Operational Parameters (of a CCE or CCS)—

CCE settings e.g. fan speed, or temperature settings of an air conditioner. The setting of the variables is typically responsive to commands sent to the CCE, either responsive to user control (via a control board or panel) or by a controller supervising overall performance thermal comfort, which is subjective, but may be estimated by suitable measurements. An operational parameter value may influence CCS performance.

Many electrical heaters have a knob-like control with temperature marks indicative of target temperature settings by the user. Typically, such heaters continuously measure the air temperature nearby (or the panel surface temperature) and may cutoff operation when the target temperature, set by the knob, is reached. Here, the operation setting or operational parameter is the state of the knob, as opposed to the temperature measured by the sensor. Measuring the temperature (thermal comfort variable) is independent of the temperature setting (operational parameter) but may influence the actual air temperature. If, in this case, the heater's electrical power is low and the room or space in which the heater is positioned has low quality thermal isolation, then if the outdoor temperatures considerably drop, the heater may not be able to provide significant heating, hence the room temperature may be only marginally influenced by the heater (illustrating the possible disassociation between a knob setting and an actual temperature measurement).

Primary and Secondary CCEs—The primary CCE group includes e.g. consists of at least one CCE, which influences directly through its operation and its associated operational parameters, the operation of the secondary CCE group, which includes e.g. consists of at least one CCE, by manipulating their associated operation parameters. In contrast to Direct influence/control/coupling, in indirect influence, thermal comfort conditions are changed by one or more CCEs, and, as a result, other CCEs may react and change their operation as thermal comfort variables are altered and may have been part of their control scheme.

A controller may segment CCES into primary and secondary CCEs dynamically e.g. the segmentation may be a merely temporary assignment (e.g. by the controller) which may later be removed or changed completely. A primary CCE may at one point become a secondary CCE responding to another primary CCE, or, in another example, a secondary CCE may become, at a certain point, independent in its own operation settings. There may be more than one segmentation within a group of CCEs in the same time frame. For example, a system with 7 CCEs, namely elements A, B, C, D, E, F and G, may initially not be segmented at all, meaning that each CCE is configured independently of one of each other. After some time, they are segmented into [Primary (A,G), Secondary (C)] and [Primary (D), Secondary (B,F)]. At this stage, elements A and G influence C, and D influences B and F, while E remains with no association (hence operating only through some direct control with no dependencies).

Autonomous Program Execution a program is executed and monitored by the CCE itself without the need to update other devices or controllers or to wait for additional commands.

Centralized Control—intended to include a method or a system in which thermal comfort is controlled by a single element, either a designated CCE or some dedicated controller.

Controller—intended to include a system or programmable hardware device which governs a complete climate control system by configuring the programs for various CCEs. Configuration may be responsive to a scheduled event (e.g., night mode) or to certain sensed conditions (e.g., human intervention, extreme climate changes etc.).

Cyclic Program—intended to include a program which is applied repeatedly and periodically (e.g., turn fan on for X minutes then turn off for Y minutes, then on again for X minutes, etc.)

Synchronized Control aka Synchronous control—intended to include cyclic programs of different CCEs which are initialized and executed together e.g. in a timely coupled manner and share the same time period of operation (e.g., executed together every T units of time). Or, a single CCE operates a cyclic program (i.e. program which is repeated continuously, where repetitions may be triggered by time e.g. every T seconds) which is time controlled by a controller. Synchronized control includes the case of fixed delays between the synchronized CCEs which are phase locked (the time offset remains invariant through the operation). in a system with plural CCEs all of which are cyclic, these CCEs, if they all share a single timeline and cycle time, are synchronous. For example, CCE1, CCE2, CCE3, CCE4 may all obey a 1 minute cycle. CCE1 and CCE2 start the program together at the same instant. CCE3 starts exactly 10 seconds after the cycle begins (hence end 10 seconds later, since their cycle too is 1 minute). CCE4 has a 30 second cycle yet is matched with the cycle start of CCE1/2. Asynchronous operation occurs if for example plural CCEs all have a built in "1 minute" clock but their cycle starts at random points of time, which is not coordinated between the CCEs.

Use-case 6 described below is an example of synchronous control.

Figure 9A:
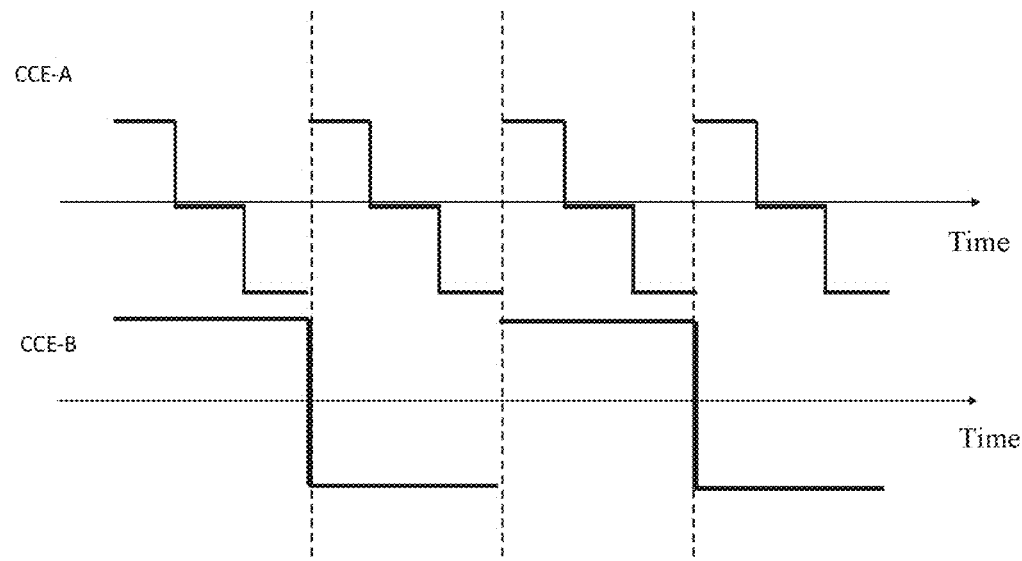
FIG. 9a illustrates an example of harmonized control, the first CCE using a time period which is 3 times smaller than the second CCE.
Figure 9B:
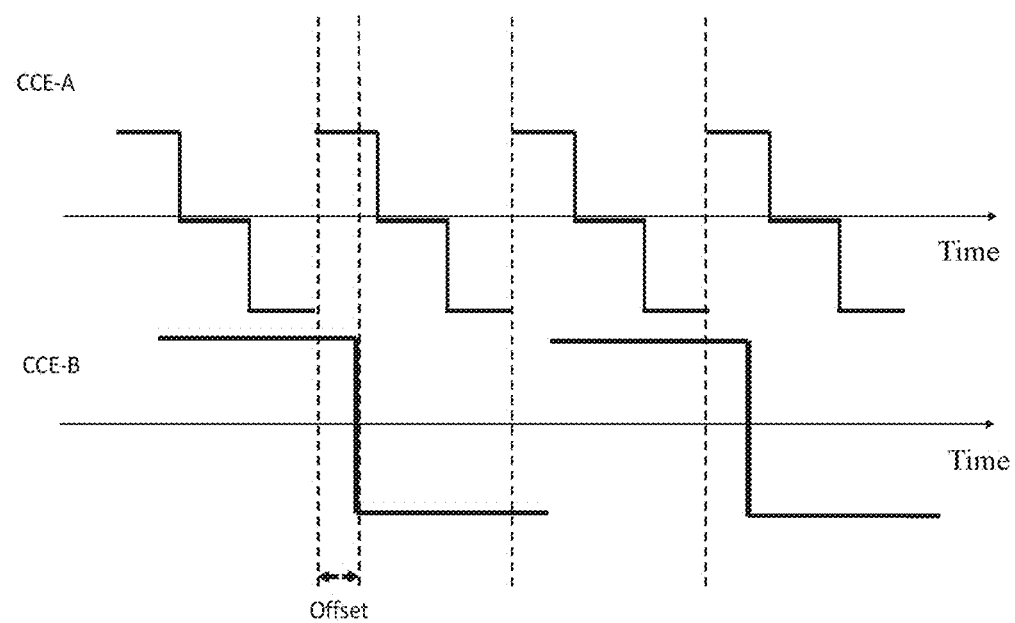
FIG. 9b illustrates an embodiment similar to FIG. 9a with a fixed time offset being introduced (phased locked)

Harmonized Control—This a special case of synchronized control in which cyclic programs of different CCEs are synchronized and share some fundamental time base period, T: All programs of various CCEs may all be cyclically executed every T time units (e.g. every T seconds, minutes, hours, days etc.), or alternatively, some cyclic programs are executed every N*T units, while other cyclic programs are executed every M*T units (M and N being integers), and either way, all the cyclic programs are synchronized to the same time base. For example, CCE #1 and CCE #2 each execute their program every 1 minute, while CCE #3, executes its program every 3 minutes—synchronized to the same time base as CCE #1 and CCE #2. Harmonized control includes the case in which there are fixed delays (e.g. as in the embodiment of FIG. 9b) between the harmonized CCEs as they are phase locked (the time offset remains invariant through the operation).

Asynchronized Control—intended to include programs of different CCEs which are initialized and executed independently, typically in a "fire-and-forget" manner e.g. as described above. CCEs which operate a cyclic program but are not synchronized to any other element, neither to a controller, nor to any another CCE, are also considered to be asynchronous.

Hysteresis Control—intended to include a CCE or CCS which maintains a certain operational characteristic (e.g., fan is left (maintained) in its 'on' state, and velocity is maintained at a medium level). The operational characteristic is paused or modified (e.g., fan is turned off, velocity increases or decreases) when a thermal performance related variable U (e.g., air temperature, relative humidity) which is monitored (e.g., measured every time period) increases beyond a certain value (Q+h). Some time afterwards the thermal performance related variable U decreases below a certain value (Q−h), at which point the previous operational characteristic is restored (e.g., fan on, medium velocity). Q is defined as the central threshold setting, while h is defined as the hysteresis parameter, 2h being the hysteresis gap itself.

Alternatively, a certain operational characteristic is activated when a thermal performance related variable U increases beyond a certain value (Q+h) and is de-activated when some time afterwards the variable U decreases below a certain value (Q−h).

Figure 1B:
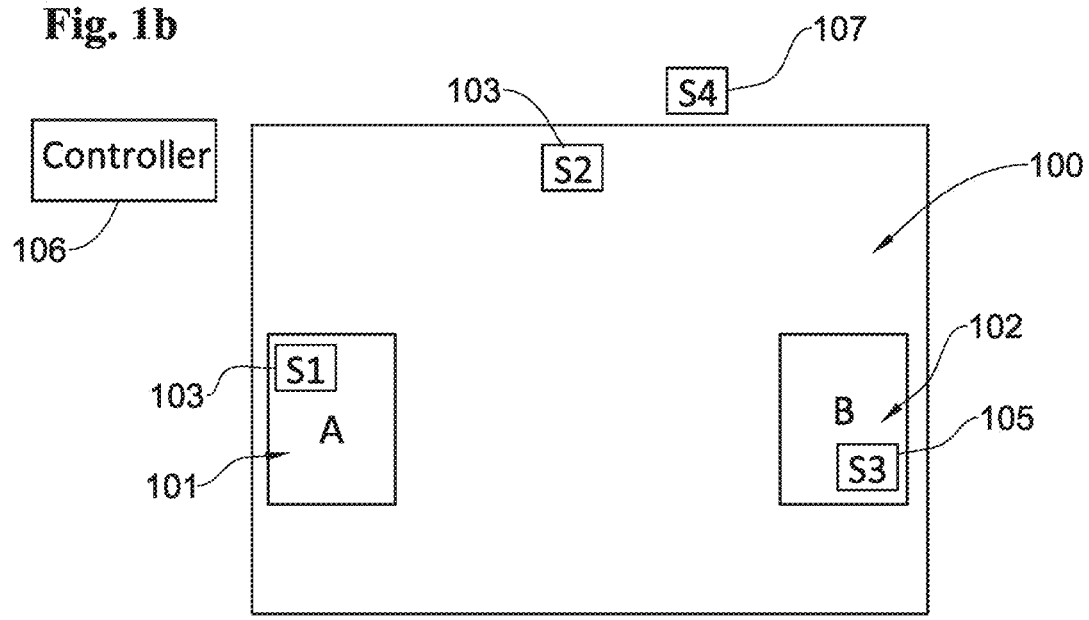
FIG. 1b illustrates a climate control system implemented in a confined space, including a controller and several climate control elements and sensors (different sensor association and location)

FIGS. 1a and 1b illustrate one basic set-up according to an embodiment of the invention:
FIG. 1a shows an enclosed or space (e.g., room) (100) in which is installed a climate control system (CCS) which includes e.g. consists of 2 climate control elements A (101) and B (102), a controller (106), sensors S1, S2, S3 . . . (e.g. 103, 104, 105).

As shown in FIG. 1b, some sensors may be part of the climate control elements or even external to the confined space itself (107).

The number of CCEs or sensors or their location may vary from embodiment to embodiment, and the quantities of CCEs and sensors illustrated by way of example in FIGS. 1a and 1b are for explanation and simplification purposes only.

Use-Case 1 (Basic Coupling Between Program Settings)

This is a case in which operational parameters of at least one ("primary") CCE are used, typically together with other environmental variables, to compute the parameters of other ("secondary") CCEs.

A confined space (100) with a CCS including at least 2 CCEs, CCE-A (101) and CCE-B (102).

The CCS controller (106) is about to send programs to CCE-A and CCE-B

The program to be sent to CCE-A, contains at least one rule (or configuration settings) Ri.

The rule (or configuration settings), Ri, contains at least one operational parameter Pi The program to be sent to CCE-B, contains at least one rule or configuration settings Rj.

The rule (or configuration settings), Rj, contains at least one operational parameter Pj The value setting of Pj depends on the value setting of Pi and the current thermal comfort values as measured by at least one of the sensors within (100) prior to the program being sent to CCE-B.

Example for Use-Case 1:
Let CCE-A be an air conditioner (HVAC)
Let CCE-B be a conventional (perhaps electrically controlled) fan
CCE-A and CCE-B both installed within a room
One of the sensors within the room, for example S1, measures the air temperature S1_T within the confined space at its surroundings (e.g., −20 to 60 Degrees Celsius). The current value of S1 is S1_T=30.
The HVAC (CCE-A) may be turned on or off and set to either operate in either cooling or heating modes. The temperature, HVAC_T, (16 to 30 Degrees Celsius) and fan power levels, HVAC_FAN, (1 to 3 max) may also be set.
The fan (CCE-B) may be turned on or off and a controller may also set the fan power level, FAN_FAN, (0 to 10 max).
At some point, the controller turns on the HVAC (CCE-A) and sends the following program to it with the settings of—Switch to cooling mode, set HVAC_T=24, set HVAC_FAN=3
In parallel, the controller turns on the fan (CCE-B), and sends the following program to it with the settings of FAN_FAN computed by $$FAN\_FAN = (2*HVAC\_FAN - 1) + MIN(MAX(0, (S1\_T - 26)), 5)$$

where HVAC_FAN is the setting used for CCE-A and S1_T is the current measured value of sensor S1.

The FAN_FAN settings (the fan level of CCE-B) is a computed value which is the sum result of two components. The first component may be directly associated with the settings of CCE-A (HVAC) and, as, in the example, the CCE-A fan level value is between 1 to 3, the component (2*HVAC_FAN−1) may contribute a value between 1 to 5.

In this case the first component, as HVAC_FAN=3, may contribute 2*3−1=5.

The second component, MIN(MAX(0,(S1_T−26)),5), depends on the thermal comfort conditions within the room which may be operationalized as a temperature measurement by sensor S1. When the temperature S1_T is less than or equal to 26 degrees Celsius, the component value is zero and does not contribute any additional fan power to CCE-B. When S1_T is between 26 to 31 degrees, this component may contribute additional 1 to 5 fan levels correspondingly. For any temperature above 31 degrees (S1_T>31), the second component may contribute 5 additional levels, in this example.

Together with the first component, the sum value is between 0 to 10, depending both on the HVAC setting and on the room temperature. As the room temperature measure by S1 is S1_T=30, the second component may contribute MIN(MAX(4,2),5)=4 hence the FAN_FAN setting may be 5+4=9.

For any of the use-cases 1-6 herein, the CCE may be a "complex" device because it integrates several capabilities. The control plan may address one or more of these abilities. For example, air treatment systems may be "complex" e.g. if they have the capability to both filter outdoor air and to modify (cool or heat, depending on season and operation mode) the outdoor air's thermal properties prior to entering the room (or house), in addition to the air treatment system's capability to blow the air at various speeds and volumes. The control plan may choose to address only the fanning capability. In another example, HVAC systems may be complex, having inherent dehumidification capabilities in addition to an ability to cool and/or heat by air convection. A control plan may address the dehumidification ability alone as part of an overall effort to control the relative humidity within the space.

Use-Case 2 (Coupling of CCE Ongoing Program Activity with Environmental and Operational Changes)

This use-case is useful inter alia when one or more of the CCEs in a system are capable of operating autonomously and of changing their operational behavior over time, while other CCEs are less capable, and, instead, rely (to an extent) on the intelligent decisions taken by the more complex operating CCEs.

In Use-case 2, operational parameters of at least one ("primary") CCE is/are used together with other thermal comfort variables to compute the operational parameters of other, "secondary" CCEs and to update the secondary CCEs' operational parameters from time to time due to expected changes in the thermal comfort (as a result of the climate control system's operation). This arrangement affects both the thermal comfort related variables and the operational parameters of other CCEs' which respond to environmental changes.

Same setup as Use-case 1 e.g. as with Use-case 1, the value setting of Pj depends both on the current value setting of Pi and the thermal comfort values as measured by at least one of the sensors within (100).
   However, the following particulars differ between use-cases 1 and 2:
   In contrast to Use-case 1, in which the program is typically sent to CCE-B only once and its parameters and variables are set and computed as soon as the program is about to be sent, in Use-case 2, the program is updated with a new Pj value in a timely manner (e.g., continuously or once in a while or once every fixed period) as the thermal comfort variables may fluctuate and change. Therefore, the corresponding rule Rj of the corresponding program being used by CCE-B may be accordingly updated.

The update may be based on repeating previous measurements which were done in the initial configuration phase and accessing again the operational parameters of the primary CCEs. While an operational parameter of a primary CCE, received some initial value, this parameter may have changed due to the CCE's operation cycle (e.g., fan speed may have been reconfigured).

Example for Use-Case 2:
   Similar configuration as with Use-case 1.
   At some point, the controller turns on the HVAC (CCE-A) and sends the following program to the HVAC (CCE-A) with the settings of:
   Switch to cooling mode
   Set HVAC_T=24
   Set HVAC_FAN power to automatic (Note: in this mode of fan operation, the HVAC may increase or decrease its own internal fan power, due to some autonomous decision or as a response to some external control signal).
   The system controller is set for an update cycle every (say) 15 minutes and may:
   Sample the sensor temperature S1_T measurement; and/or
   Access HVAC_FAN value of CCE-A; and/or
   Compute the FAN_FAN value e.g. by using the formula (2*HVAC_FAN−1)+MIN(MAX(0,(S1_T−26)),5); and/or
   Update CCE-B
   Due to the operation of both CCE-A and CCE-B the room temperature is expected to drop.
   Due to the operation of the system, the internal fan of CCE-A may change speed (power). However, in this example, initially, the internal fan starts at max power, HVAC_FAN=3.
   This example demonstrates how autonomous decisions taken by one CCE (CCE-A) may influence another CCE (CCE-B in the example). Specifically:
   Initially S1_T is 30, and as with Use-case 1, the fan setting FAN_FAN was set to 5+4=9.
   At some update cycle, S1_T drops down to S1_T=27. The value of HVAC_FAN is checked by the controller and there is no change in the HVAC fan operation. FAN_FAN is re-computed, using FAN_FAN=5+MIN(MAX(2,0),5)=7
   CCE-B is updated with a new value accordingly (drops fan power).
   At some update cycle afterwards, S1_T and HVAC_FAN are checked again. The room temperature as measured by S1 is now S1_T=25 and the internal fan of CCE-A is now operating at HVAC_FAN=1.
   The fan setting for CCE-B is computed, FAN_FAN=(2×1−1)+MIN(MAX(−1, 0),5)=1 indicating that even less fan power is required as the room has reached some thermal equilibrium.

If it is desired for the setting of Pi to have less impact over time on Pj, this may be accommodated in various ways by the system design e.g. a time decaying weight variable may decrease to zero over time so as to de-emphasize the contribution of Pi.

For example, instead of:

$$FAN\_FAN=(2*HVAC\_FAN-1)+MIN(MAX(0, (S1\_T-26)),5)$$

the system may use:

$$\text{FAN\_FAN} = a*(2*\text{HVAC\_FAN}-1)+(2-a)*\text{MIN}(\text{MAX}(0,(S1\_T-26)),5),$$

with a=exp(−t/tau), where t is the time that has elapsed, and tau is a time constant influencing the decay length. When t=0, a=1 and the new formula is identical to the previous one. As time passes by, the decay variable diminishes to a=0, at which point only the thermal comfort variable determines the FAN_FAN value. Other ways to introduce a time decaying weight, may use other functions which monotonously drop to zero over time (e.g., a=1/(1+t)) or may use time counters (e.g., a=1/n, n representing an integer cycle count n=1, 2, 3, . . . ).

Use-Case 3 (Trigger Based Coupling of Ongoing Program Activity)

Here, as in Use-case 2, operational parameters of at least one ("primary") CCE are used together with other thermal comfort variables to compute parameters of other, "secondary" CCEs and to update the secondary CCE's parameters accordingly as a direct result of a status change event in at least one of the primary CCEs, due to expected changes in both the thermal comfort and the operational parameters of the primary CCEs (e.g. as a result of the climate control system's operation). Optionally, as with Use-case 2, the updates may occur in addition from time to time as a planned update cycle.

The setup may resemble Use-case 2, except that the value setting of Pj depends both on the current value setting of Pi and the thermal comfort values as measured by at least one of the sensors within (100). In contrast to the previous use-cases, however, the CCE-B program is typically updated with a new Pj value as a result of an immediate status change in CCE-A.

This use-case is useful when one or more of the CCEs are capable of operating autonomously and changing their operational behavior over time accordingly, while other, typically simpler, CCEs may rely (to an extent) on the so-called immediate intelligent-like decisions taken by the more complex operating CCEs. This is in contrast to the previous use-case in which such decisions could have propagated only at certain times (e.g., every 1 minute of sampling the CCE operational parameters).

Example for Use-Case 3:

Configuration similar to Use-case 2. The system optionally operates in a continuous update cycle as with Use-case 2 (e.g., every 15 minutes). However, in contrast to the previous use-case, if CCE-A decides to change its internal fan speed (as reflected by HVAC_FAN value) CCE-A immediately sends a status change command to the controller, which initiates the same update process as with the planned update cycle described above with reference to Use-case 2.

Due to the operation of both CCE-A and CCE-B, the room temperature starts to drop.

Due to the operation of the system, the internal fan of CCE-A may change speed (power). Initially, the internal fan typically starts at max power, HVAC_FAN=3.

In this example autonomous decisions taken by CCE-A influence CCE-B as well including a trigger event. Specifically:

Initially S1_T was 30, and as with Use-case 1, the fan setting FAN_FAN was set to 5+4=9.

After some time has elapsed from the beginning of operation, the HVAC reduces its internal fan speed to HVAC_FAN=1.

The HVAC updates the controller about the change.

The controller retrieves the room air temperature through S1, now at S1_T=25

The controller computes the fan setting for CCE-B to be FAN_FAN=(2×1−1)+MIN(MAX(−1,0),5)=1, indicating that even less fan power is required as the room has reached some thermal equilibrium.

It is appreciated that without the ability to trigger an update immediately after the HVAC fan status, CCE-B would have been updated only on the next cycle after the change occurred, as the update cycle is designed for this.

Both this use-case and use-case 2 may employ a time decaying variable e.g. to de-emphasize certain influences of parameters and variables over time.

Detection of inefficiencies of a current hysteresis plan that is currently governing operation of the given climate control element typically comprises (e.g. as described in detail herein with reference to use-case 5) determining how effective are already deployed, coupled hysteresis plans (e.g. as described herein with reference to use-case 4). Any suitable parameters may be measured to determine efficacy/inefficiency e.g. all or any subset of the parameters described herein. Each time inefficiency is detected (or on at least one occasion in which inefficiency is detected), one or both of the deployed coupled hysteresis plans are modified to another set of plans (are replaced by one or more new coupled hysteresis plans. Any suitable criterion may be used to define inefficiency e.g. that a certain combination of parameters measured to determine efficacy/inefficiency falls below a given, typically predetermined threshold. For example, there may be a target goal (e.g., temperature) which is defined for a given room or premises, and inefficiency may be defined as an inability of a climate control element or system to remain at the target temperature (e.g. because the weather is extremely hot, thus the thermal load on the house is too great and the current configuration (e.g. the currently deployed, coupled hysteresis plans) do/does not allow for enough cooling power to be applied resulting in the climate control elements' inability to sustain the target temperature. For example the air conditioner part of a given climate control element may be turned-on on low power mode because the current hysteresis plan for the air conditioner part of a given climate control element calls for that low power mode. Plan-effectiveness parameters may be measured (e.g. measurement may detect that the element or system is "stuck" in its "on" mode too long and never exits to its "off" mode) which may be indicative of a situation in which the deployed, coupled hysteresis plans do not provide enough cooling/heating energy to balance outdoor thermal effects.

According to certain embodiments, e.g. as described herein with reference to use-case 5, duty cycle and/or cycle times are measured and at least one subsequent decision to switch at least one deployed coupled hysteresis plan to a new plan, is made responsive to the measurement/s of duty cycle and/or cycle time/s.

According to certain embodiments, either in combination with any of the above-described embodiment/s or stand alone, synchronization is provided, for maintaining at least one thermal comfort physical aspect (such as, for example, air pressure and/or temperature and/or humidity). A general system may include plural climate control elements such as, say, 4 elements A, B, C, D. According to certain embodiments, only a subset of the plural elements may be synchronized e.g. because the climate control elements outside that subset have no effect on the physical aspect that is to be maintained. Thus perhaps only B, C are synchronized since climate control elements A, D have no effect on the physical aspect to be maintained. An example of such a synchronous operation plan is described hereinbelow in use-case 6. In that example, net zero air pressure is to be maintained and this serves as the criteria for synchronization. There may be plural air openings which may be configured to allow air flow from the room to a concealed ceiling area and/or from the concealed ceiling area to the room. The synchronization plan may then harmonize or time the air vent opening/closing to ensure that the net air pressure within the room is zero. It is appreciated that synchronization is useful for maintaining a wide variety of thermal comfort physical aspects of which air flow is but one single example.

Each hysteresis plan typically has all or any subset of the following parameters: (x,s,P0,P1), where x is sensed, measured or computed and may comprise a direct measurement of a single sensor (e.g., current relative humidity) or a simple or weighted average or other combination of plural sensor/s measurement/s; an internal hysteresis plan state, s indicative of threshold selection, either 0 or 1, a program, P0 being activated if s=0, a program, P1 being activated if s=1, and wherein the parameters include at least one hysteresis parameter typically including at least one of: a threshold center Q, an upper threshold, a lower threshold, at least one hysteresis gap parameter h between the threshold center and at least one of an upper threshold T1=Q+h and a lower threshold T2=Q−h. Typically, the hysteresis plan is initialized with s=1, P1. Typically, while s=1, each time x exceeds the upper threshold the state is changed to s=0, thus the program activated is changed to P0 whereas while s=0, each time x falls below the lower threshold the state is changed to s=1, thus the program activated is changed to P1.

Any suitable criterion may be used to identify inability to maintain a target goal. For example, if the target goal is a temperature of 25 degrees, "inability" may be defined as detection of a temperature of over the target temperature plus one degree, at any time which is at least 3 hours after the system began operating, and/or detection of a temperature of over the target temperature plus half a degree, which persists for more than 10% of any time window of a 1 hour duration, at any time which is at least 4 hours after the system began operating.

Use-case 4 (Coupled Hysteresis Settings)

This use-case (and the other use-cases herein) may each be implemented as programs for the controller/s shown and described herein e.g. in the embodiments of FIGS. 1a-1b and 16-22.

A hysteresis control mechanism maintains a double threshold scheme, according to certain embodiments, in which each threshold is applied through one of the directions of change prior to or subsequent to change of state within a system.

For example, consider the case of an electrical heater which is set by a user to 30 degrees Celsius. The heater maintains a 4 degrees hysteresis gap, meaning that it respects or is restricted to lie between two thresholds, 28 and 32 degrees. When the heater starts warming up, it may continue its operation until the temperature (measured by its sensor) reaches 32 degrees. Eventually, the temperature may start decreasing as the air cools, with no thermal energy being supplied by the heater itself. At this point the 28 degrees threshold is used, meaning that the heater may turn itself on again, only when the temperature drops below 28.

The hysteresis effect reduces the number of changes the system may go through (e.g., turning on and off) as some of these frequent changes may affect the system's reliability over time.

In many situations, more than one CCE may be deployed, and, theoretically, each may independently employ a hysteresis plan. However, it is particularly useful to couple between the plans, especially in cases in which CCEs deploy different climate control capabilities.

For example, a HVAC system, through its own air convection capabilities, may achieve rapid temperature changes, while a radiant based system (heated or cooled panels) has better thermal comfort potential utilizing its radiation properties, but may be slow to respond to temperature change requests. In order to maximize the potential of the complete system, and operate it efficiently, it may be useful to couple between the control plans of such elements. First define a general hysteresis plan H(x,Q,h,s,P0,P1) including all or any subset of the following:

A measurable or computed variable x
A threshold center Q
A hysteresis gap parameter h defining upper and lower thresholds relative to the center
An internal hysteresis plan state, s indicative of threshold selection, either 0 or 1
A program, P0 being activated if s=0
A program, P1 being activated if s=1
The plan is initialized with s=1, P1
While s=1, If x>(Q+h), then the state is changed to s=0, the program activated is changed to P0
While s=0, if x<(Q−h), then the state is changed to s=1, the program activated is changed to P1

Figure 2A:
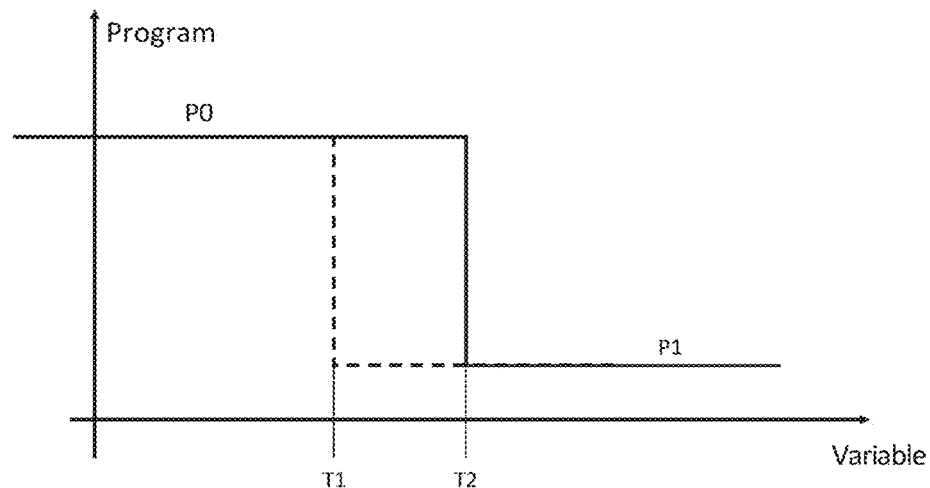
FIG. 2a illustrates a hysteresis plan using thresholds and program switching.
Figure 2B:
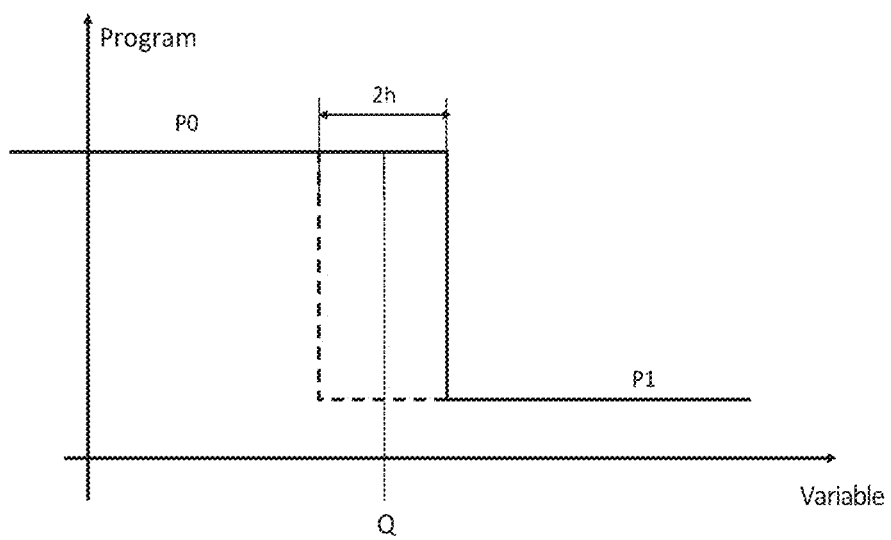
FIG. 2b illustrates a hysteresis plan defined by a central threshold (Q) and hysteresis gap parameters (h)

Comparable hysteresis plans may have alternative representations. For example, instead of defining the threshold scheme by Q and h (representing one (upper) threshold being Q+h and another (lower) threshold being Q−h, e.g. as per FIG. 2b), they may be directly defined as one threshold being T1, second threshold T2 (e.g. as per FIG. 2a). These plans are identical if Q=(T1+T2)/2 and h=(T1−T2)/2. In addition, and e.g. as previously noted, the plans may be augmented by switching plans, or modifying the variable used by the plan (e.g., using a function of the variable instead of the variable itself).

The variable x may represent a direct measurement of a single sensor (e.g., current relative humidity) or some weighted average of several sensors (e.g., several thermometers within the room) or a filtered version of such measurements or calculations (e.g. sliding window $x_n=(u_n+u_{n-1}+u_{n-2})/3$ where $u_n$ is the current measurement, (n-k) representing previous measurements). In other cases the sensor itself actually processes its own measurements and reports back to the controller any filtered updates.

Similar to Use-case 1, environment and settings are defined with some modifications. As shown, a confined space (100) may be provided, with a CCS including at least 2 CCEs, CCE-A (101) and CCE-B (102). The CCS controller (106) plans to send programs to CCE-A and CCE-B. The CCS controller (106) typically derives a hysteresis plan H(x,Q,h,s,P0,P1) for CCE-A. The CCS controller (106) typically derives a hysteresis plan H(y,Q',h',s',R0,R1) for CCE-B where Q'=f(Q,h) and h'=g(Q,h). Q' and h' are computed and derived from the CCE-A hysteresis plan. They are not set independently. The variables x and y are based on the information measured by the system sensors; these sensors may be either internal or external to the confined space, or as internal part of CCEs. Alternatively, both hysteresis plans may be derived from the same parameters and data, hence they are dependent. In this case, the CCS controller may use some target functional goal (e.g., reduce the relative humidity to 50%) and then derives and computes the hysteresis plan parameters for all of its CCEs using the common parameters as set by the common functional goal. For example, a common goal would be a target room air temperature T, which may then be used as the basis for determining all hysteresis plans and their associated parameters. The controller may take into account the fact that one of its CCEs has some operational advantages in one domain, while other CCEs have some operational advantage in another, and adjust their associated hysteresis plans consequently. The hysteresis plans are typically coupled, no matter how specifically the coupling was achieved.

Example for Use-Case 4:

CCE-A, represents a HVAC system while CCE-B represents a radiant system (typically installed in the floor, and in some cases within the walls or ceiling, for either cooling or heating the surfaces). In this example the hysteresis variables are the same for CCE-A and CCE-B and is the room air temperature as measured by one or more sensors. In this example, it is desired to heat up a cold room (e.g., winter season) to some designated temperature T (e.g., by user), for example, assume T=27 degrees Celsius.

The system may then function as follows: When the room is cold, both elements, CCE-A and CCE-B are activated to operate. Once the room warms up, and the air temperature approaches the desired temperature, the HVAC system is typically controlled to reduce its operation to a lower level of power or a minimum, while the radiant system continues to operate. Once the room is warm enough, the radiant system is typically controlled to shut down.

When the room starts to cool down, at a certain point the radiant system is typically controlled to restart its operation. If the radiant system cannot handle the temperature drop (e.g., due to insufficient thermal energy), then at a certain point the HVAC system may determine that efficient operation is not occurring and may then maximize its operation. Typically, the controller programs the HVAC (CCE-A) with the following hysteresis plan (e.g. as per FIG. 3a): Thresholds are set in general at (say) T2=T−1 and T1=T−5. For T=27 this may mean that the HVAC minimizes its operation at a lower temperature T2=(T−1)=26 degrees, and reverts to maximum operation at, say, T1=(T−5)=22 degrees hence Q=(22+26)/2=24, h=(26−22)/2=2.

For any T (in the above numerical example), Q=(T1+T2)/2=T−3. Thus the value of h remains independent of T, as h=(T2−T1)/2=2.

Figure 3A:
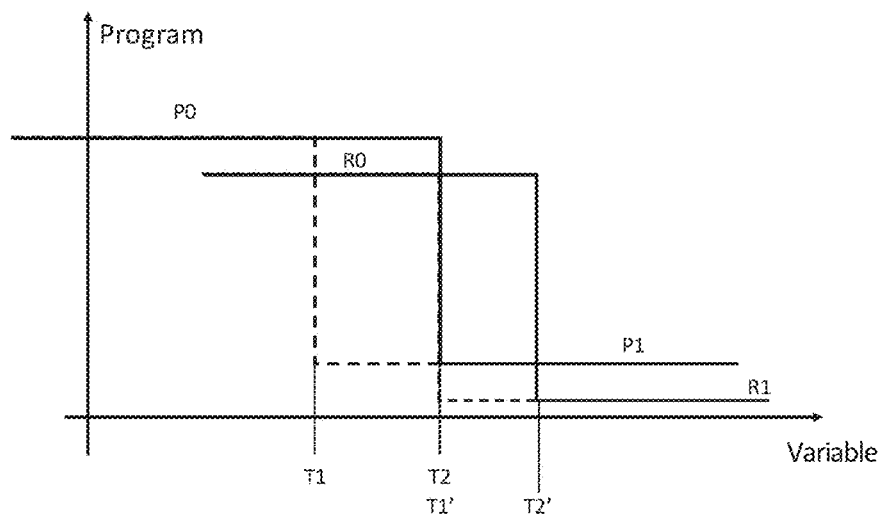
FIG. 3a illustrates a hysteresis plan for two CCEs.

Based on the HVAC hysteresis plan, and the inherent capabilities of the radiant system (CCE-B), the radiant system's hysteresis plan may be derived (e.g. as per FIG. 3a). As the radiant system typically is controlled to switch off after the HVAC has minimalized its operation, the threshold T2' is typically greater than T2 degrees (e.g. in this case T2'>26)

The radiant system may switch on again before the HVAC system returns back to full operation, hence its other threshold T1' is typically greater than T1 degrees (in this case T1'>22).

A decision may be made to set T1'=T2 and h'=h. This decision couples between the HVAC appliance's hysteresis plan and the radiant appliance's hysteresis plan. since one hysteresis plan's parameter/s, for one climate control appliance, are being derived from parameter/s of another climate control appliance's hysteresis plan. Based on a target temperature of (say) T=28, the controller derives T1'=26 h'=h=2 and T2'=T1'+2h'=30 for the radiant hysteresis plan, corresponding to Q'=(26+30)/2=28, h'=2.: For any T (in this example), T2'=T1'+2h'=T2+2h hence, Q'=(T1'+T2')/2=T2+h=T+h−1=T+1. Based on the target temperature of T=27, the controller derives T1'=26 T2'=30 for the plan corresponding to Q'=(26+30)/2=28, h'=(30−26)/2=2 e.g. as previously noted. The controller sends corresponding hysteresis plans to the HVAC and radiant systems and initializes operation.

In this example, the hysteresis variable is identical for all CCEs, yet in reality, the radiant system could have chosen a different variable (e.g., a different sensor).

There may be different choices available for T1' and T2' which may fulfill the functional targets, yet other considerations may favor certain choices such as system reliability, which may be impaired if a small hysteresis gap is deployed and may switch devices too often.

Use-case 5 (Switchable Hysteresis Plans)

Figure 3B:
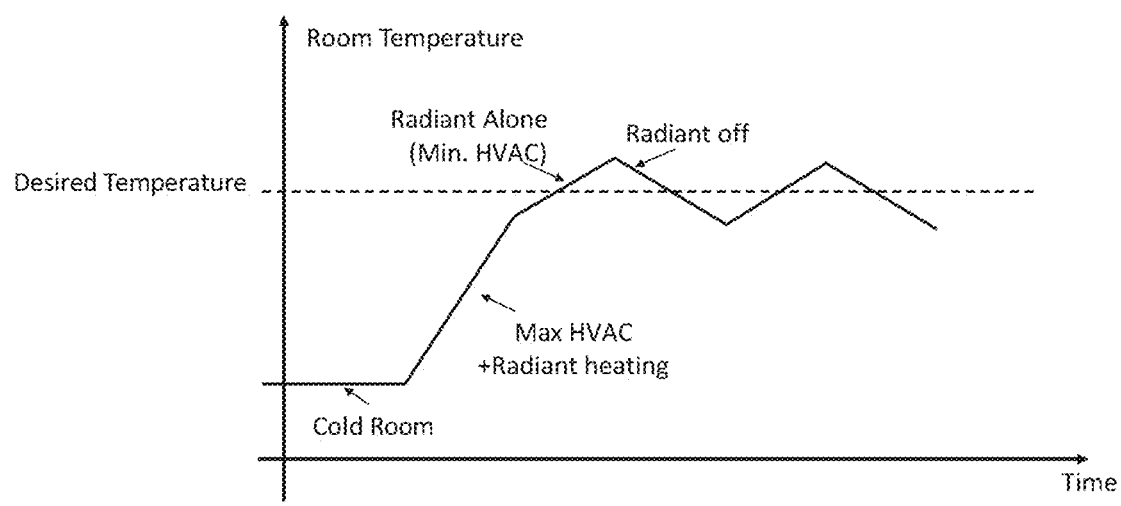
FIG. 3b illustrates system behavior of deployed plans (FIG. 3a) under normal conditions.

Although the previous use-cases present significant advantages over systems which deploy independent hysteresis plans, from a thermal comfort perspective, static choices made during the configuration phase of the system may not be able to cope with the ongoing thermal fluctuations which the system is exposed to. The following example is illustrative and is not intended to be limiting:

In FIG. 3b, the example of the previous use-case (Use-case 4) is used and the plot demonstrates how the room air temperature changes over time as the system operates. Under normal conditions the system seems to function properly. Initially the room is cold. The system turns on HVAC on some maximum power settings, and the radiant system as well (CCE-A, CCE-B). The room air temperature rises quickly until a cut-off point for the HVAC is reached and it switches to a minimal operational mode (e.g., off, fan only, etc.). The room continues to warm up slowly as only the radiant system is operative until a certain point, at which the room is warm enough, and the radiant system also shuts down. When the room temperature starts to drop (cooling back), after some time the radiant system is turned on again, and so on. Thus, in normal conditions the air temperature fluctuations are small enough with the radiant system taking care about maintaining this operating working point.

Figure 4:
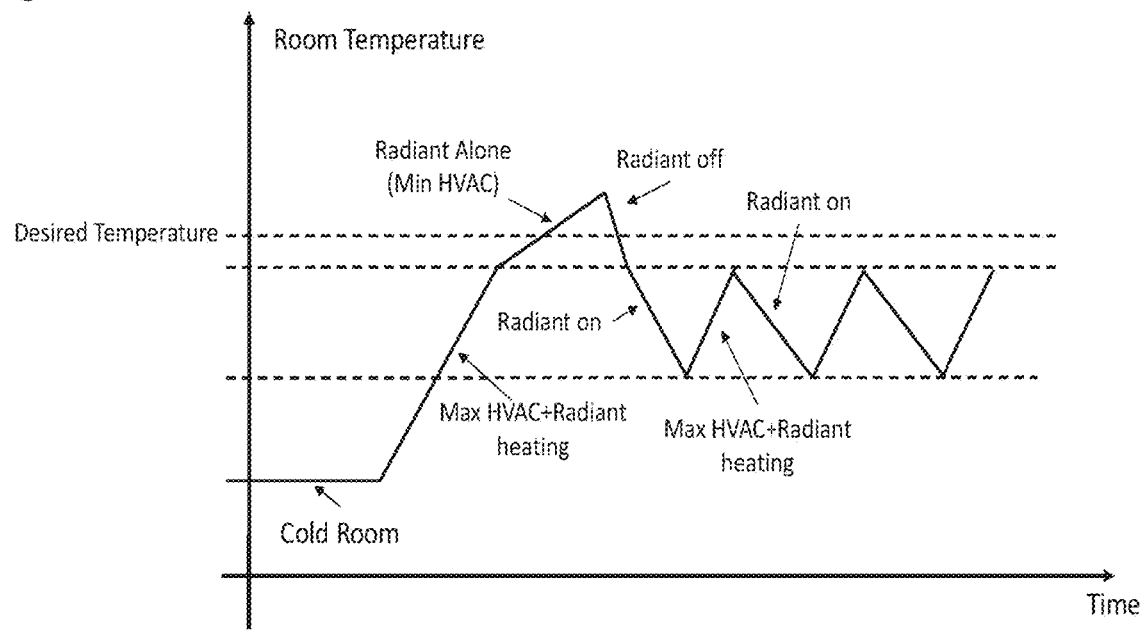
FIG. 4 illustrates as system behavior of deployed plans (FIG. 3a) under unexpected conditions which demonstrate the need for updating the current plans.

If, for example, the outdoor conditions deteriorate and temperatures drop further, the previous response of the system may change to the one presented in FIG. 4. When, at a certain point the room air temperature begins to fall, the radiant system alone may not be able to accommodate the situation (e.g., there is not enough thermal energy), and although it is turned on, it only slows down the temperature drop, but does not stop it. At some point the hysteresis plan of the HVAC may activate back the HVAC to full power, room air temperature may rise up again, the HVAC may cut-off at a certain point, and, after some time, may return to its minimum operating state. The cycle of temperatures dropping and rising repeats itself, but the room air temperature fluctuations may be much greater than that demonstrated in FIG. 3b and in addition the target temperature goal is missed due to the fact that the hysteresis plans do not match the overall system conditions. This is experienced as a significant decline in thermal comfort levels as the periods of insufficient heating dominate the system's ongoing operation.

In this case, the programming of the different CCEs needs to change and adapt to the newly presented situation. In previous use-cases, specifically Use-case 2 and Use-case 3, several methods were described for accommodating the need to change the CCE programing. In these use-cases, the operational parameters and thermal comfort variables were accessed or measured through the ongoing system operation and the CCE programs were updated 'on the fly', either periodically, or by some trigger event.

These use-cases are all applicable here as the hysteresis plan of a CCE is essentially based on two critical parameters (Q,h) as previously explained, which define the thresholds and the behavior of the system. It is acknowledged that each of the previous use-cases may be implemented in the case of a hysteresis plan, setting Q, and has a function of thermal comfort variable values or by being responsive to status changes in other CCEs (e.g., fan speed drop).

Although the previously presented methods may be used for accommodating the operational scenarios discussed, a more efficient method is required.

The example of FIG. 4 demonstrates the ability to detect that the hysteresis plans are not matching the current environmental conditions. After such detection has been made, the hysteresis plans may be either tuned or replaced by other plans to accommodate these conditions. The tuning or replacement process continues until new adjusted plans may handle the conditions.

Referring again to FIG. 4, all or any subset of the following indicators may detect a problem:
Firstly, the target or desired temperature goal is not achieved (not enough heating); and/or
Secondly, there are too many unplanned on-off transitions (as the wrong CCE, HVAC switches too often from off to on to off states, while the radiant system does not switch off at all, and remains on forever)
Specifically, in FIG. 4, the system reaches a point at which it operates in repeated cycles. Each cycle starts with a time period during which one particular behavioral state is noticed, and then for the remaining time (of the cycle) a different behavioral state is noticed. In FIG. 4, a cycle starts with the HVAC being at a minimal performance state and then switching into maximum performance state (e.g., off/on).

Figure 5:
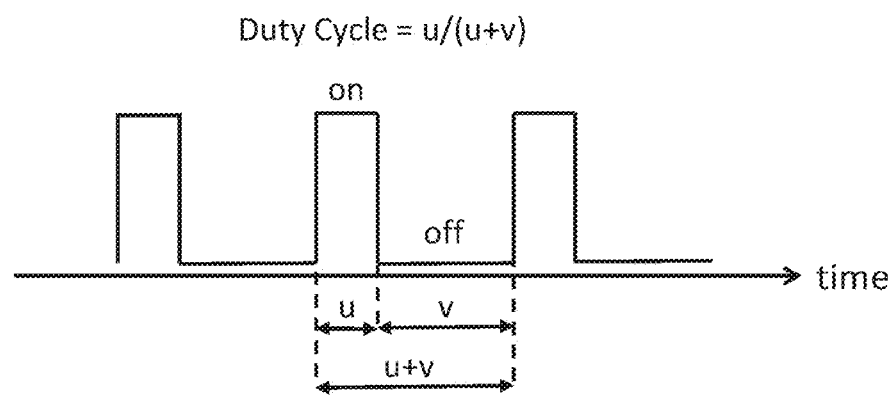
FIG. 5 illustrates a definition of a duty cycle.

In FIG. 5, the term "duty-cycle" is presented for generally defining a cycle-based activity, including e.g. consisting of two distinguishable time based segments. the duty cycle may be expressed as the ratio between the duration of one of the behavioral states to duration of the full activity cycle. Typically, the state chosen for the duty cycle computation is the state which presents some higher activity (e.g., "system on").

A duty cycle may be used as an indicator for hysteresis plan mismatch. If the duty cycle of a CCE is approaching 100%, then this may be considered to be full utilization of the CCE's resources, with no "resting-periods". Such a CCE is operating at its peak and may barely if at all accommodate the current thermal conditions. On the other hand, if the duty cycle of a CCE is low and approaching 0%, this may be considered as a low or minimal amount of CCE power investment, hence the CCE may easily accommodate current thermal conditions.

The full cycle duration length may serve as an indicator as well. As the cycles become shorter this may be used as an indication that it is currently more difficult for the system to handle the current thermal conditions, e.g. due to the fact that when the system is turned off, temperatures drop quickly and within a short time frame the system is required to turn back on again.

Reverting again to FIG. 4, it is apparent that the radiant system is at 100% duty cycle, indicating that it cannot handle the thermal conditions alone. In addition, as the desired temperature is not reached, coupled with the fact that the HVAC system's duty cycle is not on the edges (neither 0% nor 100%) then this actually indicates that the HVAC is not optimally utilized, and this may be rectified by changing its hysteresis plan.

The operational duty cycles and cycle durations are thus monitored in addition to other variables indicative of whether the target operational point is met (e.g., desired room temperature). Together these serve as indicators to initiate updates to CCE programs in general, and, in this case tuning, updating or replacing the hysteresis plans.

Any suitable tuning process of hysteresis plans and any suitable set of hysteresis plans may be used for a selection process (switching between them). The hysteresis plans or their associated tuning algorithms may be designed in advance, per deployment, due to the fact that the association and coupling between different CCEs depends on their actual existence within a system (installed or not), their particular specifications (e.g., power ratings, capabilities), and their exact location within the confined space (e.g., floor, ceiling, near windows).

Therefore, certain embodiments seek to provide detection of dysfunctional plans and initiate adjustments and changes in the core plan itself (e.g., changing the hysteresis gap and/or temperature thresholds). The following operational flow describes an example in which the new plans are derived by selecting a new plan from an existing set of plans based on the severity of the situation which is measured by certain conditions. Alternatively or in addition, metrics may be derived from the situation severity, and may be used for computing new parameters for the plan.

Any method for creating an updated plan based on observations or measurements or computations made (e.g., targets met, duty cycle too high etc.) may be sufficient for implementation.

Given a climate control system CCS:
Given climate control elements CCEs, divided into functional groups, G1, G2, . . . e.g. as per their functional association (e.g., fan and HVAC assisting one each other in their operation may be in one group.
For each CCE intended for a hysteresis plan, at least two plans may be maintained in memory, one for a normal operation mode, and another plan used while in "modification" mode. Practically, more plans may be used, offering better resolution for handling the update transition. For example the usage of 4 plan types: one for a normal operation mode, one for various degrees of modification severity e.g. one for minor modification mode, one for a moderate modification mode, and one for a significant modification mode.

According to certain embodiments, if a target operation point or target value of an aspect of operation (e.g., temperature value and/or relative humidity level) is not met, then:
Derive Duty cycle, $D_i$; and/or Cycle time, $C_i$ for each $CCE_i$ which maintains or operates according to a hysteresis plan the following:
And/or for each function group $G_i$, and for each $CCE_j$ within the group which maintains a hysteresis plan, check if:
$D_i > D_{max}$, where $D_{max}$ is a threshold for detecting high utilization (e.g., $D_{max} = 95\%$) and/or
$C_i < C_{min}$, where $C_{min}$ is a threshold for detecting frequent switching (e.g., $C_{min} = 3$ minutes) and/or
Determine how much modification is required (severity) e.g. using a table in computer memory such as, for example, the table of FIG. 11. After, typically, all CCEs within the group are checked, and modification severity (degree of modification) is, typically, used to re-select the plans for each CCE within the group based on the group and coupling association.

If target operation point is met, then Derive Duty cycle, $D_i$; and/or Cycle time, $C_i$ for each $CCE_i$ which maintains a hysteresis plan, and/or For each function group $G_i$, and for each CCEj within the group which maintains a hysteresis plan, determine if: Di>Dmax, where Dmax is a threshold for detecting high utilization (e.g., Dmax=95%); and/or if Ci<Cmin, where Cmin is a threshold for detecting frequent switching (e.g., Cmin=3 minutes); and/or determine how much modification is required (severity) e.g. using a table in computer memory such as, for example, the table of FIG. 12. After all CCEs within the group are, typically, checked, the modification severity is used to re-select the plans for each CCE within the group based on the group and coupling association. In this case as the operational targets are met, only minor changes or modifications are typically implemented, if at all, as the target operation point is met.

Figure 6:
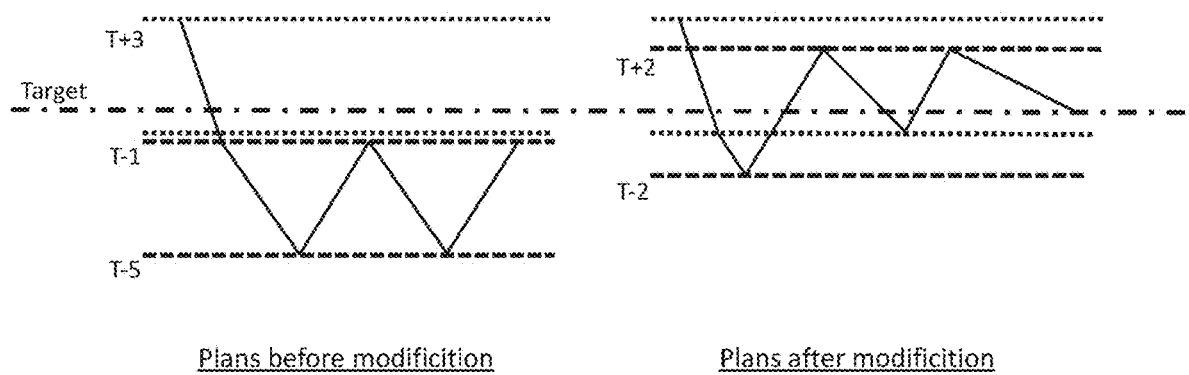
FIG. 6 illustrates a system behavior prior to modification of plans and after modifications.

Example for Use-Case 5:

For simplicity (for this example), use a shortened notation [Q,h] for denoting the hysteresis plan for the example discussed in Use-case 4. The HVAC hysteresis plan was set to [T−3,2] while the radiant used a different hysteresis plan set to [T+1,2]. If the HVAC system thresholds were (T−5) and (T−1), while the radiant system thresholds were (T−1) and (T+3). The T used in these plans is a parameter related to the target air temperature (e.g. as per FIG. 6, left part).

For this case consider the plan of Use-case 4 as the normal or default plan. A modification mode plan is added for this current case and example and is defined as [T,2] for the HVAC, while the radiant system plan remains the same. In this case, the thresholds for the HVAC system are (T−2) and (T+2) while the radiant system thresholds are (T−1, T+3) for the radiant based system (e.g. as per FIG. 6, right part).

In a scenario in which the thermal equilibrium as changed due to falling temperatures outdoors, the plans used for Use-case 4 cannot accommodate these changes, as previously explained. This is typically observed by the algorithm (e.g. previously mentioned) as the operating duty cycle of the radiant system is 100%, while the operating target of the system is not fulfilled. With the new plan, however, the HVAC system operating point is now on average at a higher state, contributing more thermal energy to the room, while the radiant system remains on (at least for the period which requires its additional energy contribution). The fluctuations of room temperature are smaller, and, in addition, the frequency of HVAC switching (on/off) is reduced, hence providing better thermal comfort conditions.

Use-Case 6 (Synchronous Control and Asynchronous Control)

This is a case in which the execution of CCE programs are coupled in time, or some of CCEs of the CCS execute their programs in sync, either in a synchronized or in a harmonized manner. According to certain embodiments, the CCEs of the CCS are segmented and organized into groups, in which some of groups operate either in a synchronized or in a harmonized manner among the group associates (CCEs within the group). The groups themselves may be synchronized or harmonized between each other.

Some other groups may be operated in an asynchronous manner ("fire-and-forget").

Synchronized or harmonized control includes the case in which there are fixed delays between the synchronized or harmonized CCEs as they are phase locked (the time offset remains invariant through the operation).

The number of groups, the number of members within a group, and the time control properties (e.g., synchronized, harmonized, asynchronous) remain flexible. For example, there could be one group which includes e.g. consists of 2 CCSs, and two other groups, each comprising a single CCS, each operating asynchronously.

Certain embodiments include deploying a synchronized or harmonized control method for complying with certain system performance goals e.g. any known in the art, or any described herein.

Figure 7A:
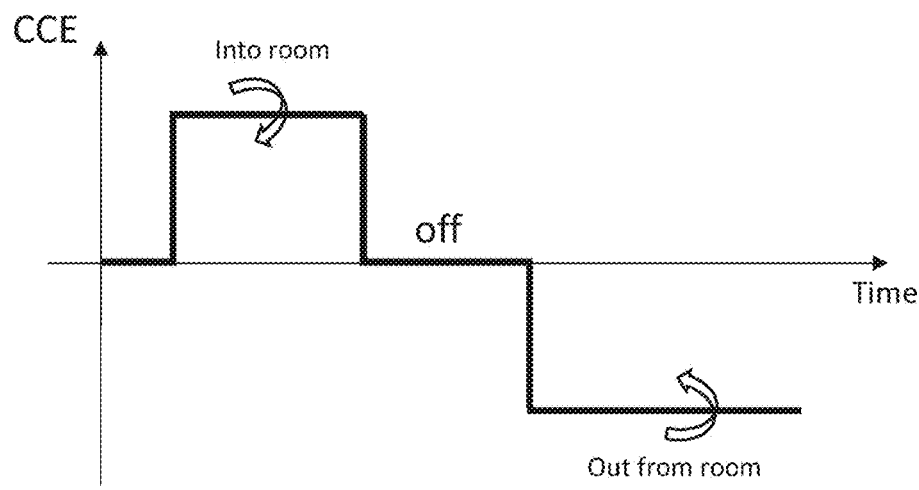
FIG. 7a illustrates an example of a switching program for a device with fanning functionality.

Referring again to FIG. 1a or 1b by way of example, assume that both CCEs (A and B) have only bidirectional fanning abilities which allow them to either provide treated air (hot or cold) from some other controlled system (not seen in the Fig., for example through an air duct supply) or extract air back from the room into the system, or to be turned off completely (air block). Both systems are identical in performance. In FIG. 7a, the three possible operational modes are demonstrated. The ternary signal represents three modes of operation, intake, outtake, and block.

While the main goal could be maintaining a certain room air temperature or relative humidity, and some of the techniques presented in the previous use-cases may be applicable, in many cases, an additional goal or restriction needs to be accommodated. For example, the goal may be that total volumetric air flow within the room may be nullified in order to avoid air pressure surplus or deficiency, which may cause uncontrolled air flow into the room or out of the room, disrupting thermal comfort control efforts.

Figure 7B:
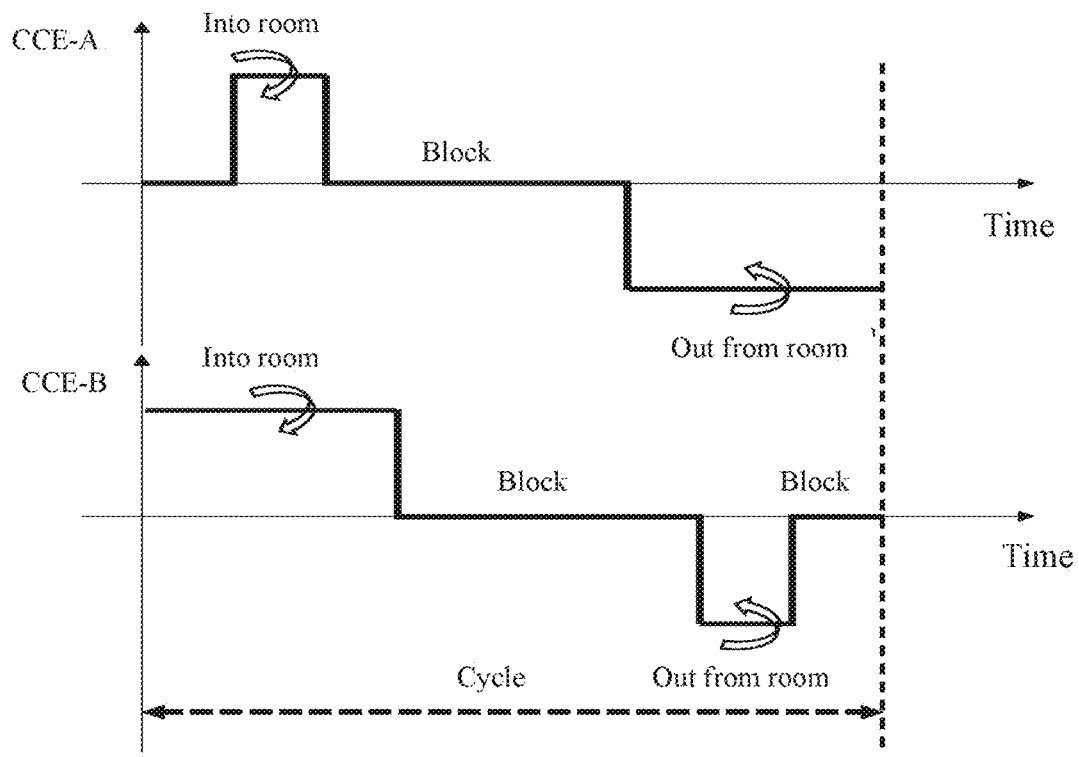
FIG. 7b illustrates a coupling between 2 CCEs with fanning abilities and synchronizing their control operation.
Figure 7C:
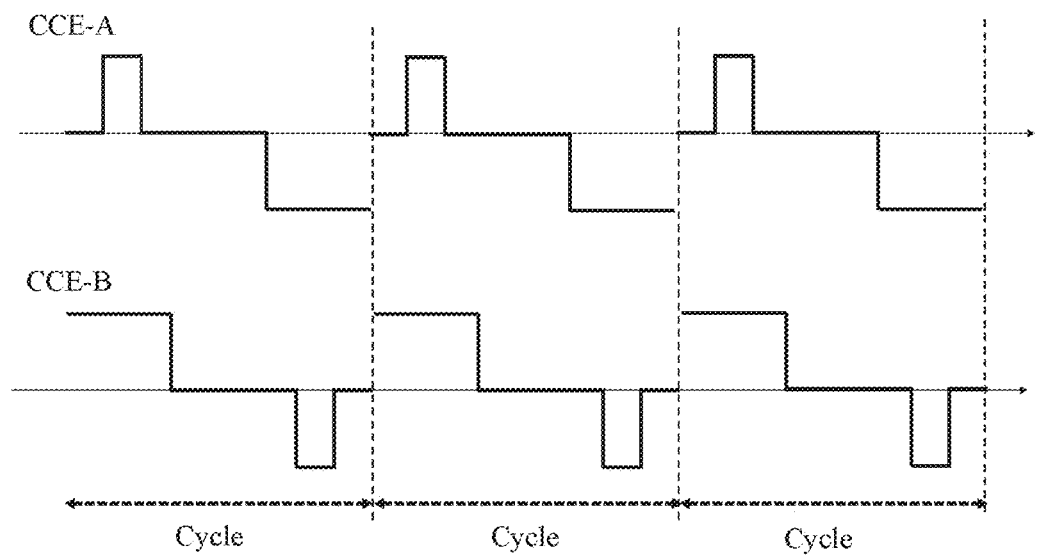
FIG. 7c illustrates a coupling between 2 CCEs with fanning abilities and synchronizing their control operation over time (several cycles are shown)

In this case, in order to accommodate the "net-zero" air flow, all the volumetric air flow quantities of both CCEs need to sum up to zero. In FIG. 7b, the control signals for both CCEs are shown. In this Fig., CCE-A spends most of its time extracting air from the room, while CCE-B spends most of its time providing air into the room. In FIG. 7c, this cycle is repeated. CCE-A and CCE-B are synchronized with zero time offset between their operation. As they are both equivalent in performance, the net volumetric air flow into the room over the operating cycle is zero (e.g., area under the curves).

Figure 8A:
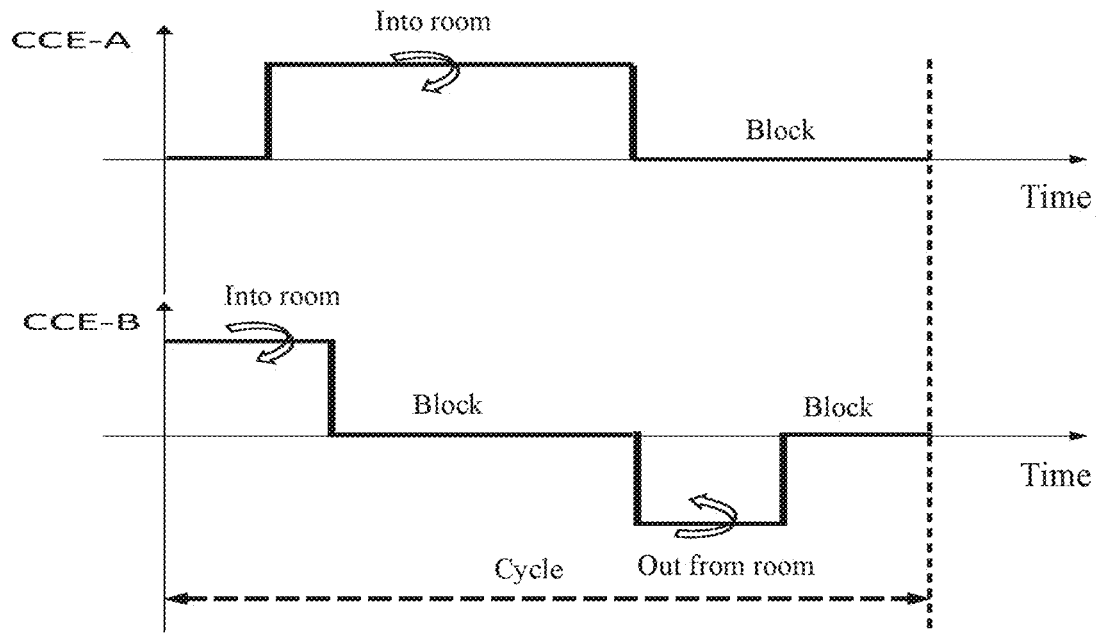
FIG. 8a illustrates an alternative planning (as compared with FIG. 7a) due to environmental changes.
Figure 8B:
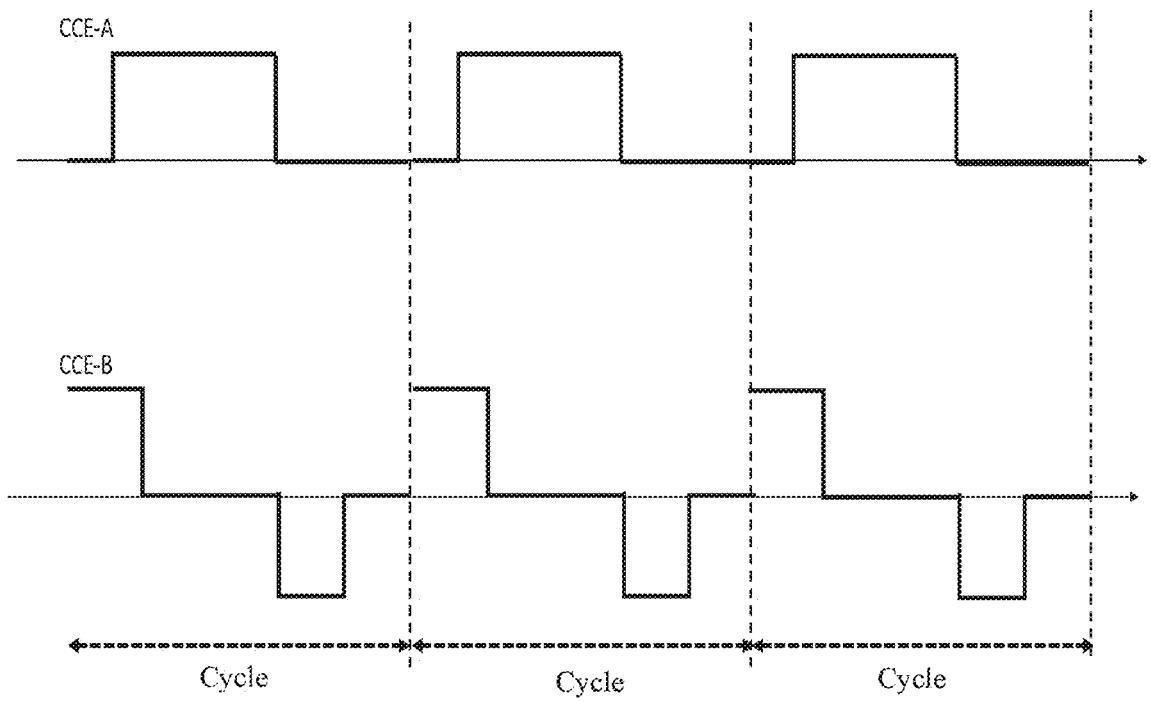
FIG. 8b illustrates an alternative planning (as compared with FIG. 7a) due to environmental changes over time (several cycles are shown)

FIG. 1a or 1b show that in this mode of operation, a person near CCE-B is exposed to better treated air which is entering the room. For example, in the summertime, this may be experienced as a cooler area. If, for example, the person changes his/her location near CCE-A, then the system may accommodate this change. In FIG. 8a, a different plan is chosen, and repeated in FIG. 8b, which emphasizes CCE-A as the element providing more treated air into the room, yet the net volumetric air flow is balanced to zero, as before.

Thus a synchronized control plan which couples between CCE-A and CCE-B, provides, on one hand, the goal of necessary thermal comfort for the occupant of the room, yet on the other hand, facilitates compliance with another goal, that there should be a balance between air, both entering the room, and exiting the room. Both functional targets are achieved. It is demonstrated that while in sync, through the changes in environmental conditions (occupant changes location within the room) the control plans are modified, while both thermal comfort and operational restrictions are sustained.

The example given for demonstrating this embodiment was chosen for simplicity and is not intended to be limiting. Inter alia, in the example, the volumetric air flow criteria may be used to balance between CCEs. Alternatively or in addition, other criteria may be considered. For example, the criteria may be minimizing or maximizing some performance metric as energy consumption, or a related goal which sets a limit to the amount of energy which may be used through the system operation, or the amount of noise (acoustic comfort) which the system may produce. More than one criterion may be imposed, and the designer's goal may be to satisfy all criteria, as required.

Fulfilling functional targets may be achieved by, for example, maintaining some prefixed plans, and then switching between them as required and/or on-the-fly adjustments may be made e.g. by gradually adjusting one CCE and compensating by the other CCEs, until the new target goals are achieved.

In some cases, the CCE is a device which integrates several capabilities and the control plan may address one or more of these abilities. For example, air treatment systems have the capability to filter outdoor air and to modify its (e.g. the outdoor air's) thermal properties (cool it down or heat it up, depending on season and operation) prior to entering the room (or house) in addition to its capability to blow the air at various speeds and volumes. The control plan may choose to address only the fanning capability. In another example, HVAC systems have inherent dehumidification capabilities in addition to their ability to cool or heat by air convection. A control plan may address the dehumidification ability alone as part of an overall effort to control the relative humidity within the space.

The CCEs may be either synchronized or harmonized with some time offset, if needed, due to operational considerations. In the previous example, CCE-A could have cycled through intake, block, outtake, every 1 minute, while CCE-B could have cycled between intake and outtake every 3 minutes (e.g. as per FIG. 9a). The basic period of 1 minute is used as the time base for both CCEs. An offset of 10 second (as an example) could have been set between them, and all goals would have been met (e.g. as per FIG. 9b).

Alternatively or in addition, e.g. as described above, additional CCEs within the same CCS deployment may be either added to the synchronized (or harmonized group) or operate as an independent group, maintaining their own time management policy. For example, consider again the case of the confined space in FIG. 1a or 1b, with two additional CCEs (now containing 4 CCEs), the first two operating synchronously according to FIG. 8a with a cycle period of 15 minutes, while the other CCEs operating synchronously according to FIG. 8b with a cycle period of 20 minutes.

In another example, additional CCEs within the same CCS deployment may operate asynchronously. As shown in FIG. 10, 3 CCEs are operative, the first two, CCE-A and CCE-B are synchronized as with the previous discussed examples, while CCE-C operates independently at unrelated periods of time (the hatched filled rectangles denote control related activity).

Figure 13:
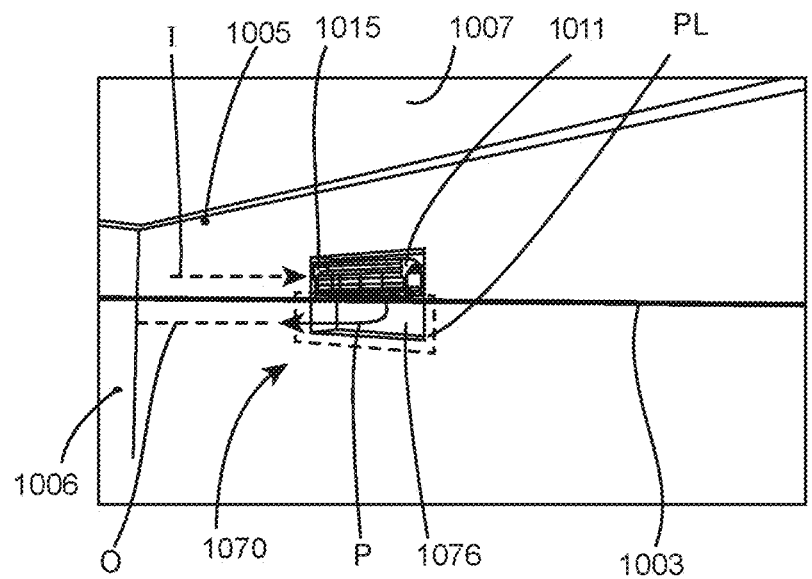
FIG. 13 illustrates a perspective view of an air convection module of an air convection system according to an example of the presently disclosed subject matter, and particularly, an air convection module, embedded in a wall of a room.
Figure 14:
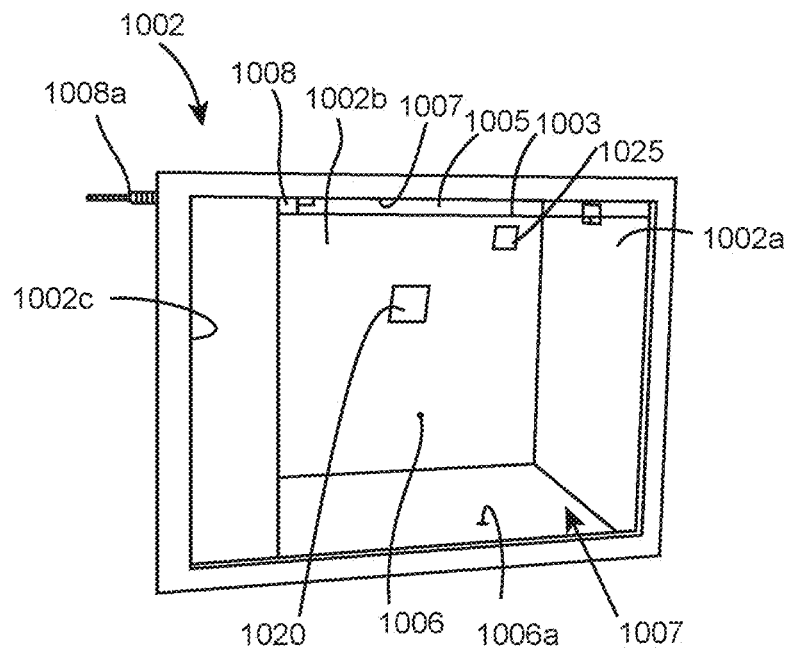
FIG. 14 illustrates a perspective view of the room of FIG. 13, with one wall removed 1010 for illustration purposes, where the air convection system is shown with its control system schematically illustrated.
Figure 15:
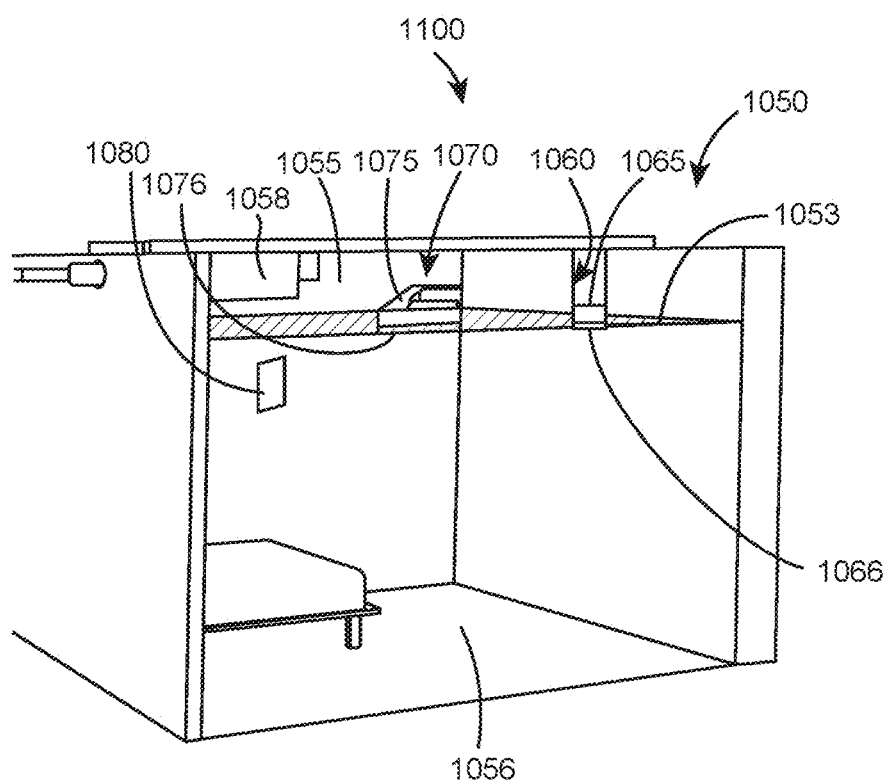
FIG. 15 illustrates a perspective view of a room installed with an air convection system according to another example of the presently disclosed subject matter, comprising two air convection modules similar to the air convection module of FIG. 13.

Any of the logic herein may be used in conjunction with any of the systems shown and described in FIGS. 13-15 herein.

According to certain embodiments, when a house is designed, CCEs are chosen, allocated and positioned within a room/space, and control plans are chosen accordingly e.g. as per any of the teachings herein. Any or all of the processes or logic or operations herein may be implemented as software in a controller; the software may also include configuration files.

Use-cases (aka embodiments) 1-6 described herein may be provided in isolation or in any suitable combination. For example, use-case 6, providing synchronous control (time base), may utilize any of the techniques described herein with reference to use-cases 1-5, as appropriate.

Given multi-CCE systems, e.g. as described herein, control procedures (including also transition plan/s) are typically coupled, using any of the coupling use-cases described herein or any suitable combination thereof.

The term coupling is intended to include any degree of association between plural e.g. two CCEs, as opposed to freely and independently programming and/or operating the two. For example, if one sets CCE1 to temperature T1 then when setting CCE2 to temperature T2, assume T2=f(T1), hence coupling between CCE's 1 and 2.

A plan is intended to include any specific autonomous subroutine, and may be part of a program. A CCS may use a CCE to execute part of its program.

Use-cases 1, 2, 3 (for example) may be combined with use-case 4 or 5 or 6. Also, use-case 6 may be combined with use-case 4 or 5.

Example: one possible climate control system, to which the embodiments or use-cases herein may be applied, is an air convection system configured for use in a building structure having a suspended ceiling dividing the building structure to an upper plenum in airflow communication with an HVAC unit, and a lower area. The air convection system may comprise an air convection module having a plenum opening configured to face the plenum and/or a lower area opening configured to face the lower area and/or a controllable airflow facilitating unit configured to selectively facilitate airflow at least from said plenum opening to the lower area opening; and/or a control system configured to receive an operational signal indicative of at least one operational parameter of said HVAC unit, and operate the airflow facilitating unit e.g. in accordance with the operational signal.

An example air convention system, to which the embodiments herein may be applied, is illustrated in FIG. 13 which is a perspective view of an air convection module of an air convection system; the air convection module may be embedded in a wall of a room. FIG. 14 illustrates a perspective view of the room of FIG. 13, with one wall removed 1010 for illustration purposes, where the air convection system is shown with its control system schematically illustrated. FIG. 15 illustrates a perspective view of a room installed with an air convection system according to another example of the presently disclosed subject matter, comprising two air convection modules similar to the air convection module of FIG. 1.

The suspended ceiling may be a stretch ceiling, a tiles ceiling, a drop out ceiling, or any other ceiling configured to form a plenum together with either the true ceiling of the building structure, or with another structure, e.g., another suspended ceiling. Particularly, the suspended ceiling may be a radiant ceiling configured to exchange heat with said plenum, and correspondingly emit or absorb heat to/from said lower area, e.g. to acquire energy from the plenum, thereby obtain a temperature different than the mean temperature of the lower area, and exchange heat with the lower area, and particularly surfaces disposed therein, by radiation. The acquiring of energy may be performed either by independent heating/cooling means formed within the ceiling, or by exchanging heat either with radiating means disposed at the plenum, or, particularly, with air within the plenum. To make the suspended ceiling susceptible to changes in air temperature within the plenum, the suspended ceiling may be thin, with low U-value (thermal transmittance due to conduction), and with a low heat capacity. To emit and absorb radiation effectively, the suspended ceiling may have high emissivity and be spread vastly to form a large view factor with the lower area.

The HVAC unit may be disposed at the plenum, or at any other location airflow coupled therewith, so as to cool/heat the plenum therefrom. The HVAC unit may be in the form of a radiating element disposed above the suspended ceiling and directed thereto, or particularly, in the form of an air conditioning unit, e.g., a fan coil unit, configured to cool and circulate the air in the plenum, and thereby affect the temperature of the suspended ceiling. The air convection module may be wall embedded or a standalone unit, and any of the openings may be disposed either independently, integral with the suspended ceiling, or integral with a wall. The wall may be a wall from which the suspended ceiling extends, optionally perpendicularly, and the openings may be spaced from each other to a distance greater than a thickness of said suspended ceiling, to be fitted from either side thereof. The two openings may define together an air flowing path extending therebetween, from the plenum opening to the lower area opening, and therebeyond, into the plenum opening and out from the lower area opening. The airflow facilitating unit may extend least partially at said air flowing path. When the openings are integral with a wall they may be both disposed in airflow communication with the same side of the wall, e.g., such that they face substantially the same direction, and the air flowing path defined thereby obtains at least partially a C-shape. Specifically, the plenum opening may have an effective air intake axis along which air is configured to flow into the air convection module, and the lower area opening may have an effective air outtake axis along which air is configured to flow out from said air convection module. Said axes may be substantially parallel.

To contribute to the thermal comfort in the lower area, the air flowing path may extend at least partially along a surface of the lower area. Particularly, the lower area opening may be integrated in a surface of at least one of a wall of the building structure and the suspended ceiling, and define an effective air outlet plane spanning parallel to that surface, so that the portion of the air flowing path extending out therefrom passes parallel and adjacent the other of the two surfaces. The lower area opening may be disposed within a furniture of the lower area, e.g., a closet, and may face the lower area indirectly through a wall of the furniture, or directly through an aperture formed therein. The air convection module may comprise a fixed portion configured to be constantly fixed to a wall of the building structure, and a detachable portion containing at reference numeral 1030 the airflow facilitating unit, configured to be attached to the fixed portion, and be detached therefrom for maintenance purposes. The airflow facilitating unit may be configured to passively facilitate airflow, e.g., be in the form of a throttle, or be configured to actively generate airflow, e.g., be in the form of a fan, impeller, or other similar device configured to actively convey air.

The airflow facilitating unit may be disposed between the plenum opening and the 5 lower area opening. Alternatively, the airflow facilitating unit may be disposed at another area effecting flow of air into the plenum opening. For example, the airflow facilitating unit may be in the form of an outlet from the plenum via which air may leave the plenum more easily than through the plenum opening, and be configured to facilitate said airflow by self-shutting, thereby making the plenum opening the easiest path available for air to flow out from the plenum. The control system may be operatively connected to the HVAC unit, optionally by wireless communication, e.g., IR, Bluetooth, WiFi, etc.

The control system may be configured to operate the airflow facilitating unit, when operation thereof is effective, e.g., when air within the plenum, being conveyed thereby to the lower area, is at a different temperature than the temperature in the lower area. As mentioned, the different temperature of air in the plenum is facilitated by operation of the HVAC unit, so that the control system may be configured to operate the air convection unit to convey air from the plenum to the lower area after it receives indication of current or recent operation of the HVAC unit. Therefore, the operational parameter may be for example current air temperature sensed by a respective temperature sensor disposed in the plenum, current air pressure sensed by a respective pressure sensor in the plenum, current operational state ON/OFF of the HVAC unit, recent operational state ON/OFF of the HVAC unit, or any other parameter indicative of operation of the HVAC unit.

According to an example, the control system is configured to operate both the airflow generating device and the HVAC unit, so indication of operation of the HVAC unit is received integrally therewith. According to a more particular example, the control system constitutes a part of a general climate control system of the building structure. According to yet more particular example, the control system is configured to receive indication from a thermal comfort sensing system configured to provide a thermal comfort signal indicative of thermal comfort in the lower area, and operate the airflow facilitating unit in accordance with said thermal comfort signal. The thermal comfort signal may be indicative of temperature, humidity, pressure, or any other thermal comfort related parameter.

The air convection module may be configured to substantially maintain temperature or humidity of air conveyed therethrough from said plenum opening to said lower area opening. According to an example, the air convection module aforementioned is a first air convection module, and the air convection system further comprises a second air convection module similar to the first air convection module. In such a case, the control system may be configured to operate both modules, optionally, in synchronization. The synchronization may be such that the control system facilitates airflow from a plenum opening to a lower area opening of one of the air convection modules, while facilitating airflow from a lower area opening to a plenum opening of another of the air convection modules, thereby inducing circulation of air between the plenum and said lower area. Such arrangement may solve pressure accumulation problems at the plenum, which may cause distortion of the suspended ceiling, e.g., when the suspended ceiling is a stretch ceiling.

According to an example, the control system comprises a pressure sensing system, e.g., a pressure gauge, within the plenum, configured to sense a pressure parameter indicative of air pressure within the plenum, and is configured to operate, one or both airflow facilitating units, in accordance with readings of said pressure sensor. The airflow facilitating unit may be further configured to selectively facilitate airflow at the opposite direction, e.g., from the lower area opening to the plenum opening. In such a case, the control system may be configured to operate said airflow facilitating unit in a back-and-fourth operation mode, where typically, air is being conveyed from the plenum to the lower area, and also, e.g. secondly, in the opposite direction, to maintain a predetermined value of the pressure parameter within the plenum.

According to an example, the air convection module is integral with the HVAC unit, such that the plenum opening faces an interior of the HVAC system, and the airflow facilitating unit is either a throttle blocking one of the lower area opening and the plenum opening, or an airflow generating device of the HVAC unit. the lower area opening and the plenum opening may both be formed in the same wall of the HVAC unit, being aligned or disposed below the suspended ceiling.

The air convection system 1001 may be positioned in a room 1002 installed with a suspended ceiling, e.g., stretch ceiling 1003, dividing the room to a plenum 1005 constituting a utility area of the room 1002, and a lower living area 1006 configured to accommodate residents of the room. The plenum 1005 is confined between the stretch ceiling 1003, the actual ceiling of the room 1007, and respective portions of walls 1002a-1002d of the room 1002, and installed with an HVAC unit in the form of a fan coil unit 1008, configured to circulate air within the plenum 1005 while cooling/heating that air as it flows therethrough. The fancoil unit 1008 is connected to an appropriate ductwork 1008a passing through wall 1002c of the room 1002, configured to facilitate that cooling/heating. The air convection system 1001 is configured to facilitate air conditioning to the lower area 1006, and particularly, convection of the heated/cooled air from the plenum 1005 to the lower area 1006, e.g. as described below. The stretch ceiling 3 functions as a radiant ceiling 1005 configured to exchange heat with the heated/cooled air in the plenum 1005 by convection, and correspondingly emit/absorb heat to/from the lower area 1006 by radiation.

Particularly, the ceiling 1003 may be configured to acquire or give away energy from/to air in the plenum, by means of said heat convection, obtain a temperature different than the temperature at the lower area 1006, and use that temperature difference to exchange heat with the lower area, and particularly surfaces disposed therein such as floor 1006a, by radiation. To make the stretch ceiling 1003 susceptible to changes in air temperature within the plenum 1005, the ceiling 1003 is thin, and is formed from a material rendering it low U-value (thermal transmittance due to conduction), and low heat capacity. The thickness of the ceiling 1003 and the material from which it is made, e.g., a 15 stretchable thin membrane (0.1 mm-1 mm) made of non-metallic PVC, also renders the ceiling 1003 high emissivity, e.g., 0.7-0.95, which provide the ceiling with the ability to emit and absorb radiation effectively. Further, the spreading of the ceiling 1003 across the entire room 1002 render it a large view factor with objects at the lower area 1006.

Although radiant cooling/heating from the ceiling 1003 may be thermally comfortable for residents of the lower area 1006, it may be desired to boost the radiation effect with another aspect of heat transfer. One option to do so is by convection of cooled/heated air from the plenum 1005 to the lower area 1006, by means of the air convection module 1010, e.g. as described below. The air convection module 1010 is embedded in a wall 102a of the room 1002, at an area from which the stretch ceiling 3 perpendicularly extends. The air convection module 1010 has a plenum opening 1015 facing the plenum 1005, a lower area opening 1016 facing the lower area 1006, and an airflow facilitating unit in the form of an impeller fan 1011 disposed therebetween. The impeller 1011 is configured to convey air from the plenum opening 1015 to the lower area opening 1016 while maintaining the cooled/heated temperature 1030 of the air conveyed therethrough. The openings 1015, 1016 are spaced from each other to a distance greater than a thickness of the stretched ceiling 1003, such that they define together an air flowing path P, bypassing the stretched ceiling 1003.

Typically, the openings 1015, 1016 are disposed in airflow communication with the same side of the wall 1002a, e.g. such that the air flowing path P obtains a C-shape therebetween. Specifically, the air flowing path P extends along an effective air intake axis I of the plenum opening 1015, along which air is configured to flow into the air convection module 1010, and along an effective air outtake axis O of the lower area opening 1016, along which air is configured to flow out from the air convection module 1010. Particularly, the air outtake axis O extends parallel to the axis I, and perpendicularly to an effective air outlet plane PL of the lower area opening 1016, spanning parallel to the wall 102a. When activated, the impeller fan 1011 actively generates airflow along the airflow passageway P, from the plenum into the plenum opening 1015, from the plenum opening 1015 to the lower area opening 1016, and out therefrom to the lower area 1006. The air convection module 1010 is built such that when the impeller fan 1011 is turned off, airflow along the passageway P is prevented, thereby facilitating selective generation of airflow between the openings 1015, 1016.

To contribute to the thermal comfort in the lower area, the air flowing path P, e.g. the air outtake axis O extends parallel and adjacent the stretched ceiling 1003, thereby avoiding direct impact with residents of the lower area 1006. The air convection system 1001 further comprises a control system 10020, schematically illustrated in FIG. 14, configured to operate the impeller fan 1011. Typically, the impeller 1011 is configured to be operated by the control system 1020 when the ceiling 1003 radiates/absorbs heat to/from the lower area 1006. Particularly, a user 1025 operating a user interface, or a sensor operatively connected to the control system 1020, may decide that the heating/cooling of the lower area by radiation is insufficient, and activate the impeller 1011 by the control system 1020, to boost cooling/heating of the lower area 1006 by conveying the cooled/heated air from the plenum 1005 into the lower area 1006.

Herein, the control system 1020 comprises a thermal comfort sensing system 1025 operatively positioned at the lower area 1006, which is configured to sense a thermal comfort related parameter, e.g., temperature, at the lower area 1006. Correspondingly, the thermal comfort sensing system 1025 is configured to generate a thermal comfort signal indicative to the parameter, for the control system 20, which, in turn, is configured to operate the impeller 1011 in accordance with said signal, e.g., in accordance with a sensed value of said parameter. To ensure effective boosting of heating/cooling, e.g., to ensure that the air being conveyed by the impeller 1011 from the plenum 1005 to the lower area 1006 is either heated or cooled with respect to the air at the lower area 1006, the control system 1020 is configured to operate the impeller only after receiving indication of operation of the fan coil unit, e.g., an operational signal indicative of an operational parameter of the fan coil unit 1008.

The operational parameter may be for example current air temperature sensed by a respective temperature sensor disposed in the plenum 1005, current operational state 1010 ON/OFF of the fan coil unit 1008, recent operational state ON/OFF of the fan coil unit 1008, or any other parameter indicative of operation of the fan coil unit 1008. The operational state parameter may be determined according to a level of electric current/voltage currently passing in operational components of the fan coil unit 1008, or according to any other reading indicative to whether the fan coil unit 1008 is currently operating or recently has been operating. When the signal is generated directly by the fan coil unit 1008, the control system 1020 is typically operatively connected thereto to receive that signal.

In the example shown herein, the control system 1020 constitutes a part of a general climate control system of the room 1002, and is operatively connected to both the fan coil unit 8 and the impeller 1011, so that indication of operation of the fan coil unit 8 is received internally. Control system 20 is configured at least to operate the fan coil unit 1008 alone, the impeller 10011, under a condition that the fan coil unit 1008 is already operated or recently has been in operation, or both the impeller 1011 and the fan coil unit 1008 to simultaneously to boost rapid cooling/heating of the lower area 1006. The control system may be operatively connected to the fan coil unit 8 and the impeller 1011 by wired/wireless communication, e.g., IR, Bluetooth, WiFi, etc. FIG. 15 illustrates another example of a living room 1050 according to the present disclosure, in which two air convection modules 1060,1070 are incorporated, constituting a part of an air convection system 1100.

The living room 1050 comprises a stretch ceiling 1053, dividing the room to a plenum 1055 in which a fan coil unit 1058 is installed, and a lower area 1056 configured to accommodate residents of the room 1050. The air convection modules 1060, 1070 are functionally similar to the air convection module 1010, so that each of which has a plenum opening 1065,1075, a lower area opening 1066, 1076, and an impeller disposed therebetween. The impeller of the module 1070 is designated by reference numeral 1071, while the impeller of the module 1060 is hidden within a wall 1052*a* in which the module 1060 is embedded. Opposed to the impeller 1011, the impellers herein are configured to generate airflow in both directions, e.g., from the plenum opening 1065, 1075 to the lower area opening 1066, 1076, and from the lower area opening 1066, 1076 to the plenum opening 1065, 1075. The air convection system 1100 further comprises a control system 1080 configured to operate both modules impellers of the modules 1060 and 1070 in synchronization. The synchronization herein is such that the control system 1080 facilitates airflow from a plenum opening 1065, 1075 to a lower area opening 1066, 1076 of one of the air convection modules 1060, 1070, while facilitating airflow from a lower area opening 1066, 1076 to a plenum opening 1065, 1075 of another of the air convection modules 1060, 1070, thereby inducing circulation of air between the plenum 1055 and lower area 1056. Such arrangement may solve pressure accumulation problems at the plenum 1055 caused by one sided extraction/insertion of air thereinto, which may in turn, cause distortion of the stretch ceiling 1010.

Another way of resolving such pressure accumulation problems is to operate one or both impellers in an intermittent back-and-forth mode, where one or both impellers are operated for a predetermined time to generate airflow in one direction, and later for another predetermined time to generate airflow in the opposite direction. The two predetermined times may be identical. Further, the control system 1080 may also include a pressure sensing system 1088 incorporated with a pressure gauge configured to sense a pressure parameter indicative of air pressure within the plenum 1055. The control system 1080 may be configured to operate one or both impellers, in accordance with readings of the pressure gauge, e.g. in accordance with a sensed value of the parameter, to extract or insert air into/from the plenum 1055 and prevent excess pressure or under pressure situations.

Figure 16:
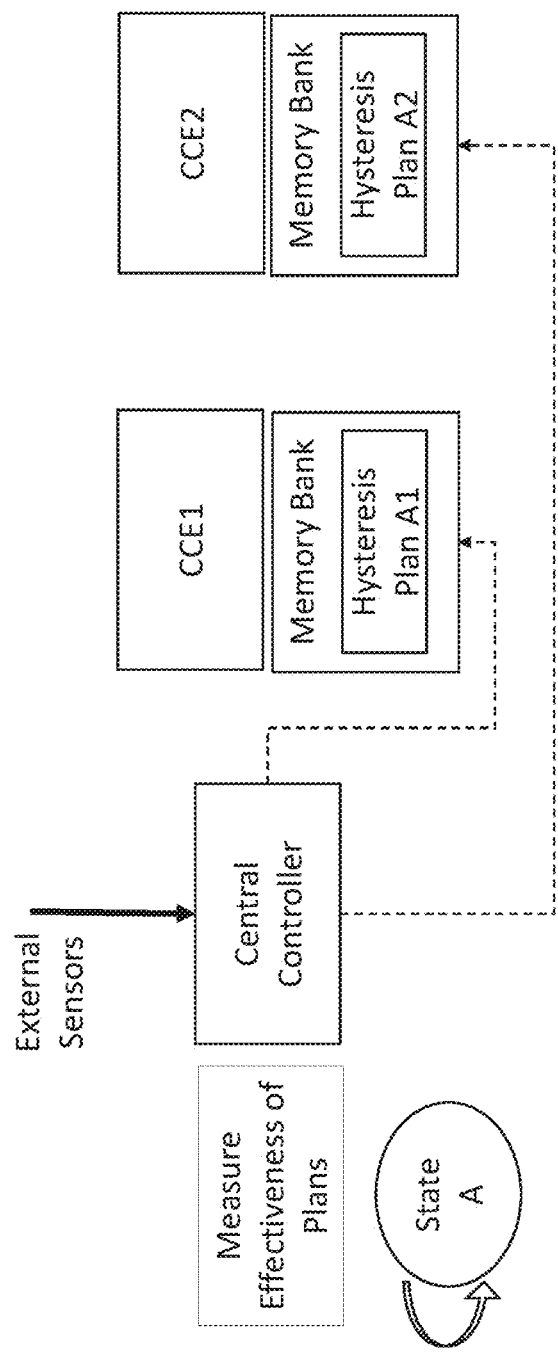
FIGS. 16-25 show an example flow (over time) for a controller of switchable plans, provided according to certain embodiments.
Figure 17:
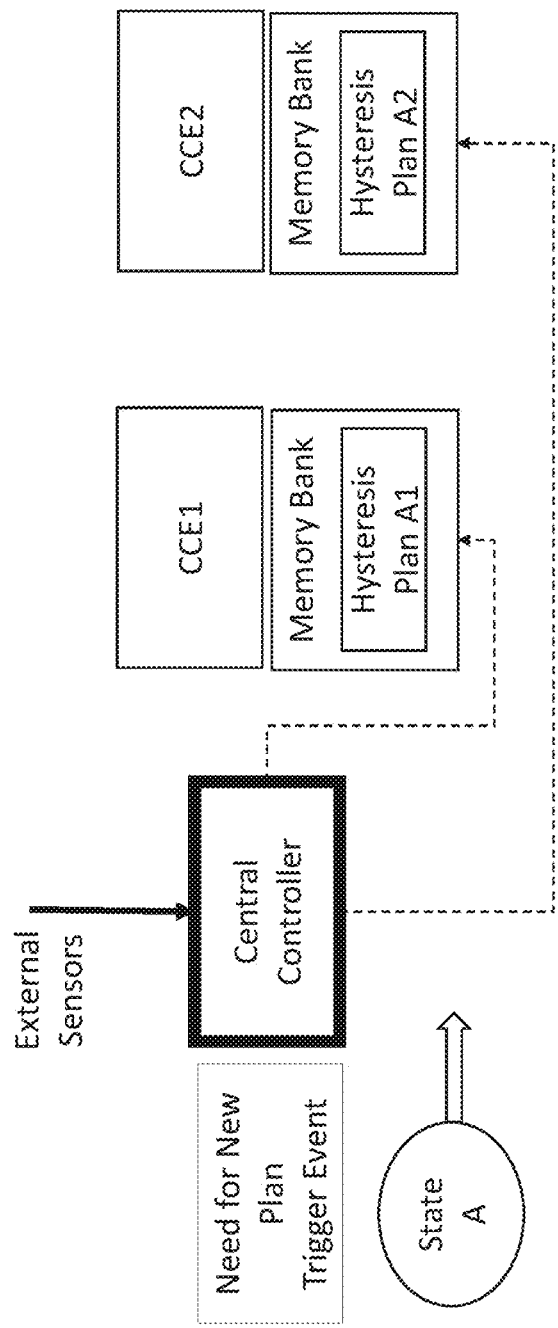
Figure 18:
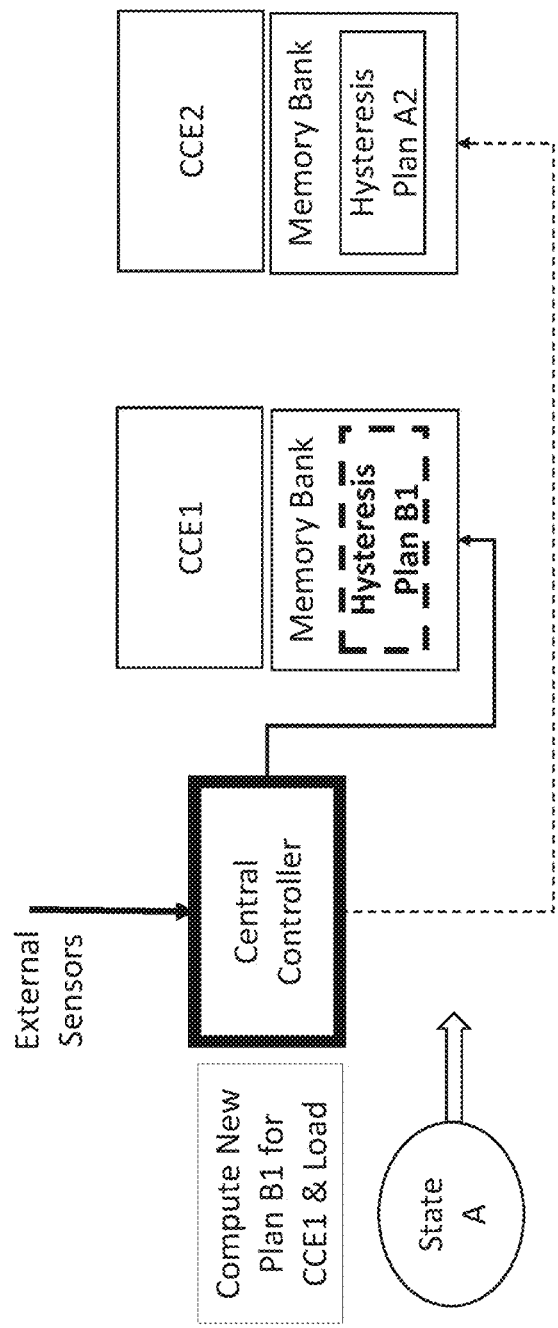
Figure 19:
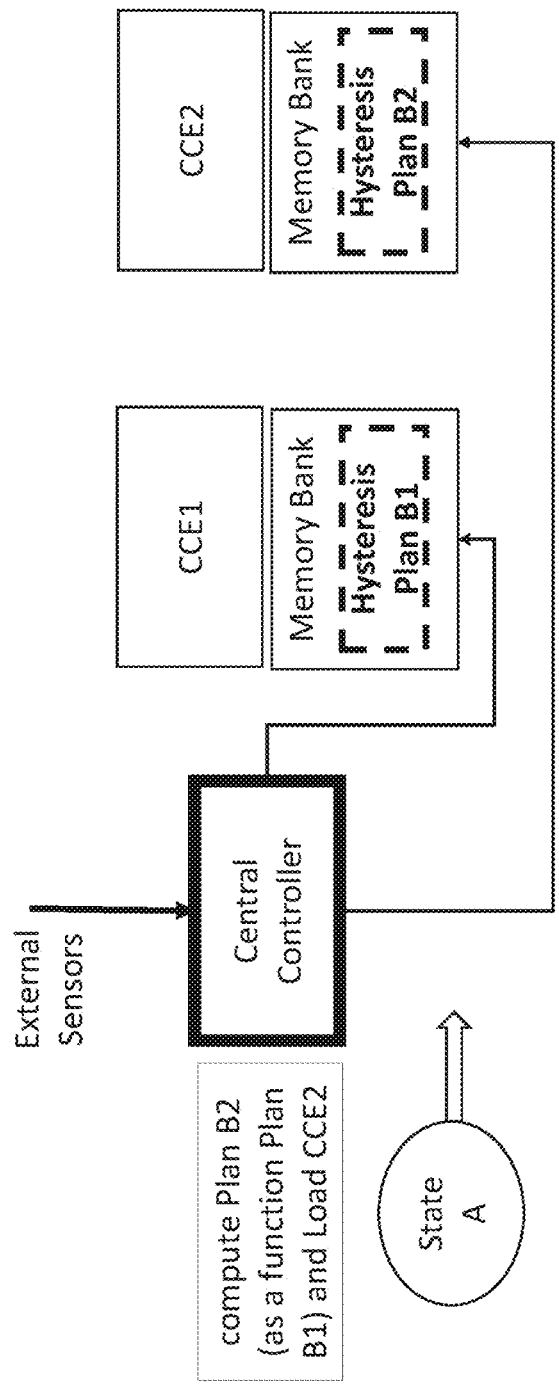
Figure 20:
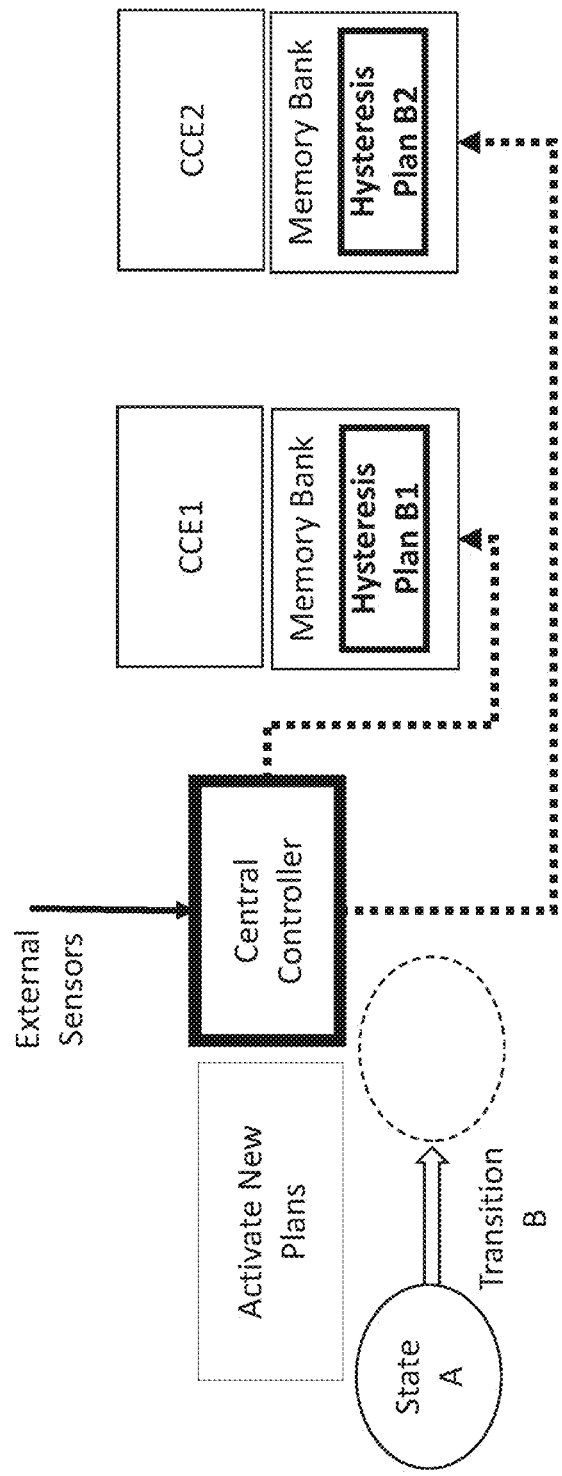
Figure 21:
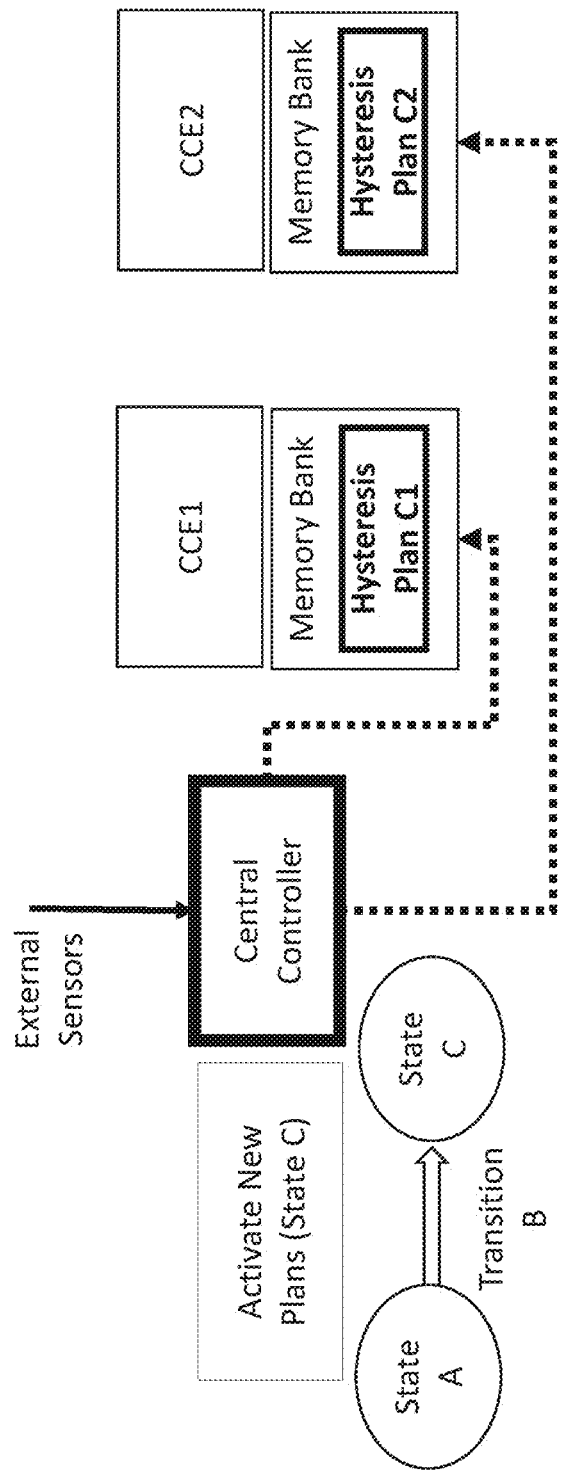
Figure 22:
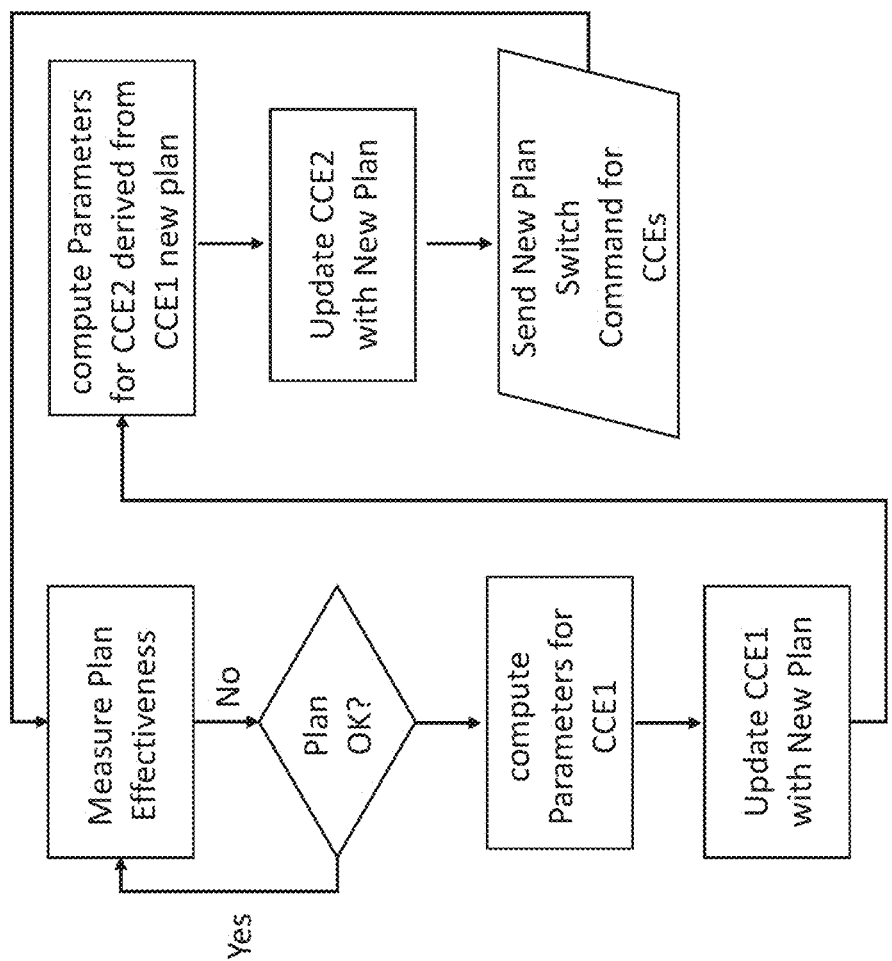

FIGS. 16-22 show an example embodiment including example flow (over time) of switchable plans e.g. as summarized in the simplified flow diagram of FIG. 22. FIG. 16 shows a specific example of a climate control system (CCS) which includes plural (say 2) climate control elements of which CCE1 and CCE2 are shown by way of example, and a centralized controller in data communication therewith. The system is shown in a state A and CCE1 is operating according to a first switchable hysteresis plan A1 whereas CCE2 is operating according to a second switchable hysteresis plan A2. As shown in FIG. 22, the controller monitors various sensors (any suitable sensor/s), typically continuously, to detect whether or not the plans are effective e.g. by measuring duty cycle or using any other method for determining whether or not the plans being used by the two climate control elements are effective e.g. as described herein. Meantime, the system continues to operate at state A. however, at a certain point, as shown in FIG. 17, the controller senses that the plans (A1 and/or A2) are not effective. The state diagram in FIG. 17 shows that state A may be abandoned and a transition of the system to a new state is to occur. In FIG. 18, the central controller computes the parameters; this computation may be based on pre-programmed values typically as a function of plan effectiveness (e.g., duty cycle levels) or may employ a formula approximating the association between certain variable/s (e.g., hysteresis gap size) and plan effectiveness. for a new hysteresis plan for CCE1, a plan called B1. The central controller communicates with CCE1 via a suitable controller-CCE1 protocol, to load CCE1's data repository or bank with the new plan B1 which replaces A1, thereby to "switch off" hysteresis plan A1 (once deactivated) and to "switch on" new plan B1 (once activated). Then, in FIG. 19, the central controller computes parameters. for a new hysteresis plan B2 for CCE2 as a function of the B1 plan computed for CCE1.

The central controller communicates with CCE2, using the (typically predefined) protocol known to both, to load the new plan B2 onto CCE2's memory repository or bank for plans, thereby to "switch off" CCE2's current switchable hysteresis plan A2 (once deactivated) and to "switch on" CCE2's new plan B2 (once activated). In FIG. 20, the central controller may command CCE1 and CCE2 to activate the newly loaded plans or may notify CCE1 and CCE2 that the new plans are now active. The state diagram of the system is now in a transition state (B). The new plans A2, B2 may also become ineffective in which case a new state may be reached. FIG. 21 pertains to a controller which has, at a later stage, sensed via any suitable sensors, that the plans are again inefficient and should again be switched or replaced or adapted, as a new state may have been reached. Similarly to FIGS. 18 and 19, new plans C1 and C2 are computed for CCE1 and then for CCE2 based on the plan for CCE1, respectively. These plans C1 and C2 are respectively loaded and activated on CCE1 and then for CCE2 e.g. as shown.

according to certain embodiments, B1 (or some other plan) is stored in the controller's memory with its parameters as a function of the sensor measurements such that the controller knows precisely how to compute the parameters of plan B1 (say) as soon as inefficiency is detected.

It is appreciated that a conventional state-machine approach for controlling a single climate control elements (CCE) or multiple identical CCEs may suffice for certain practical cases.

According to certain embodiments, CCEs (which may be plural identical CCEs in a single system) may operate in different states, where in each state a specific e.g. different operating plan typically stored in the controller, may be deployed e.g. by downloading to the CCE and activating. Typical states may for example include all or any subset of an OFF state which represents a system shut down state, a FAN-ONLY state which provides air circulation, a COOL state which is useful for cooling down the room air temperature (e.g., summer), and a HEAT state which is useful for warming up the room air temperature (e.g., winter). The control orchestration of multiple CCEs is provided by programming them asynchronously and allowing them to operate freely. In some cases the various CCEs may respectively operate in slightly modified states—for example setting the temperature of one CCE to a different temperature than another CCE, e.g. due to specific human preferences.

When the CCEs use different technologies for providing thermal comfort the control orchestration takes this into account to provide optimal performance and maximum thermal comfort. For example, one CCE may be using radiant panels which either heat up the room as a result of the panel being warm and radiating thermal energy (e.g. using the hot water passing through each panel) or cool down the room as a result of the panel absorbing and then evacuating the room heat (e.g. through the cold water cooling each panel). And/or, another CCE may be an air conditioner based on a compressor compressing gas then cycling the compressed gas through internal room and external room arrangements. And/or, another CCE may be a speed variable fan which allows for air ventilation.

Each of the above CCEs has advantages and disadvantages for energy consumption and thermal comfort considerations. Examples: The fan, for example, may consume a minimum amount of energy (say ~100 Watt) but cannot dramatically reduce the humidity level within the room. The classical air conditioner may change the climate environment quickly relative to other CCEs yet is energy wasteful (~1500-4000 Watt). The radiant system may provide the best thermal comfort under certain conditions (for example for cooling, typically the humidity levels should not be too high as condensation might occur on the walls) yet is relatively slow to respond to thermal changes or plan changes. thus a conventional state-machine approach which may have been used in the past for multiple identical CCEs may not be ideal when the CCEs are not of the same technology. Instead, an orchestration or combination of plans or programs may be provided which is configured to leverage each CCE's advantage and to minimize ill effects of each CCE's disadvantages. The orchestration process typically takes into account transitions between different states and may store and apply/activate a specific plan for a transition from state A to state B, which differs from, say, the hysteresis plan for state A and from the plan for state B.

Figure 23:
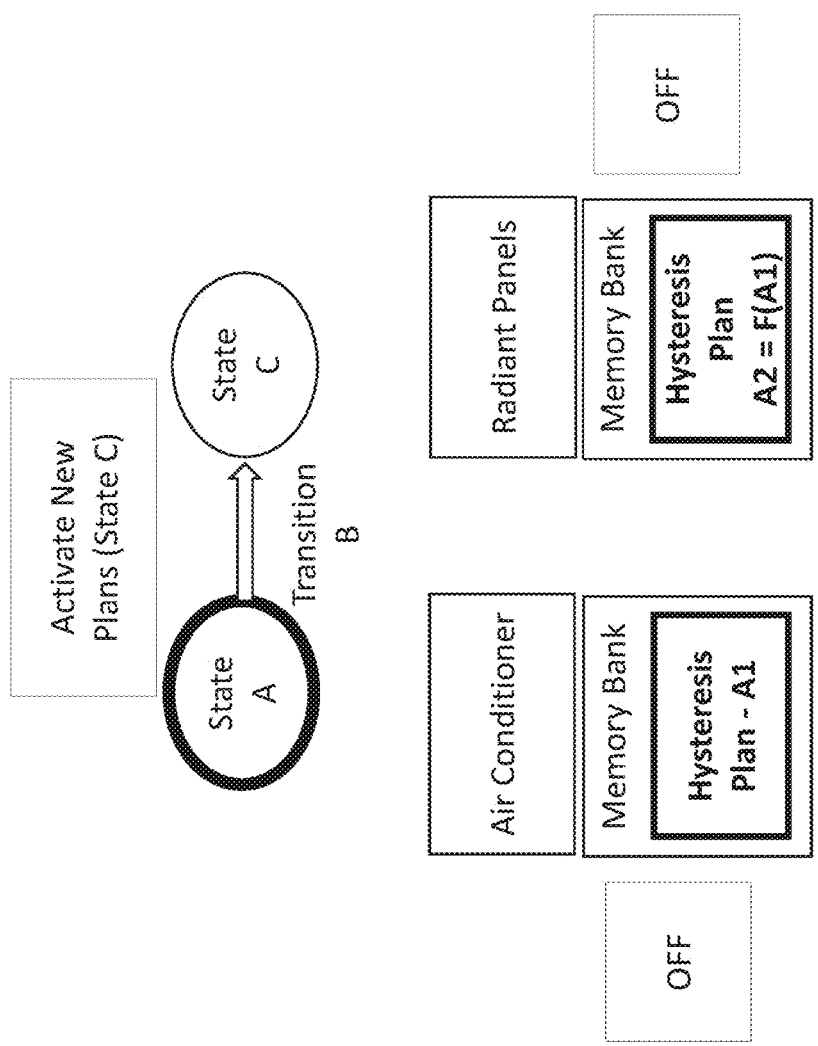
Figure 24:
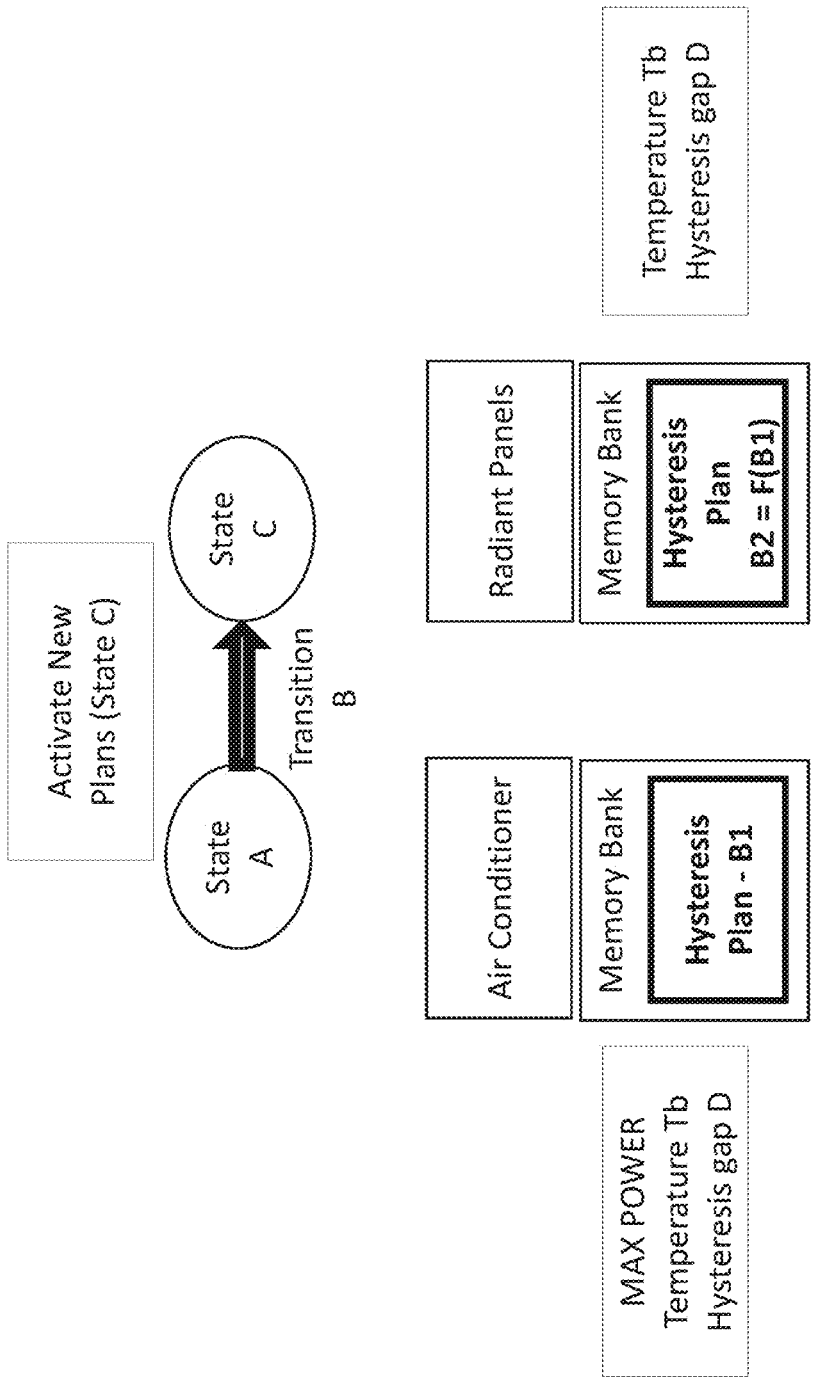
Figure 25:
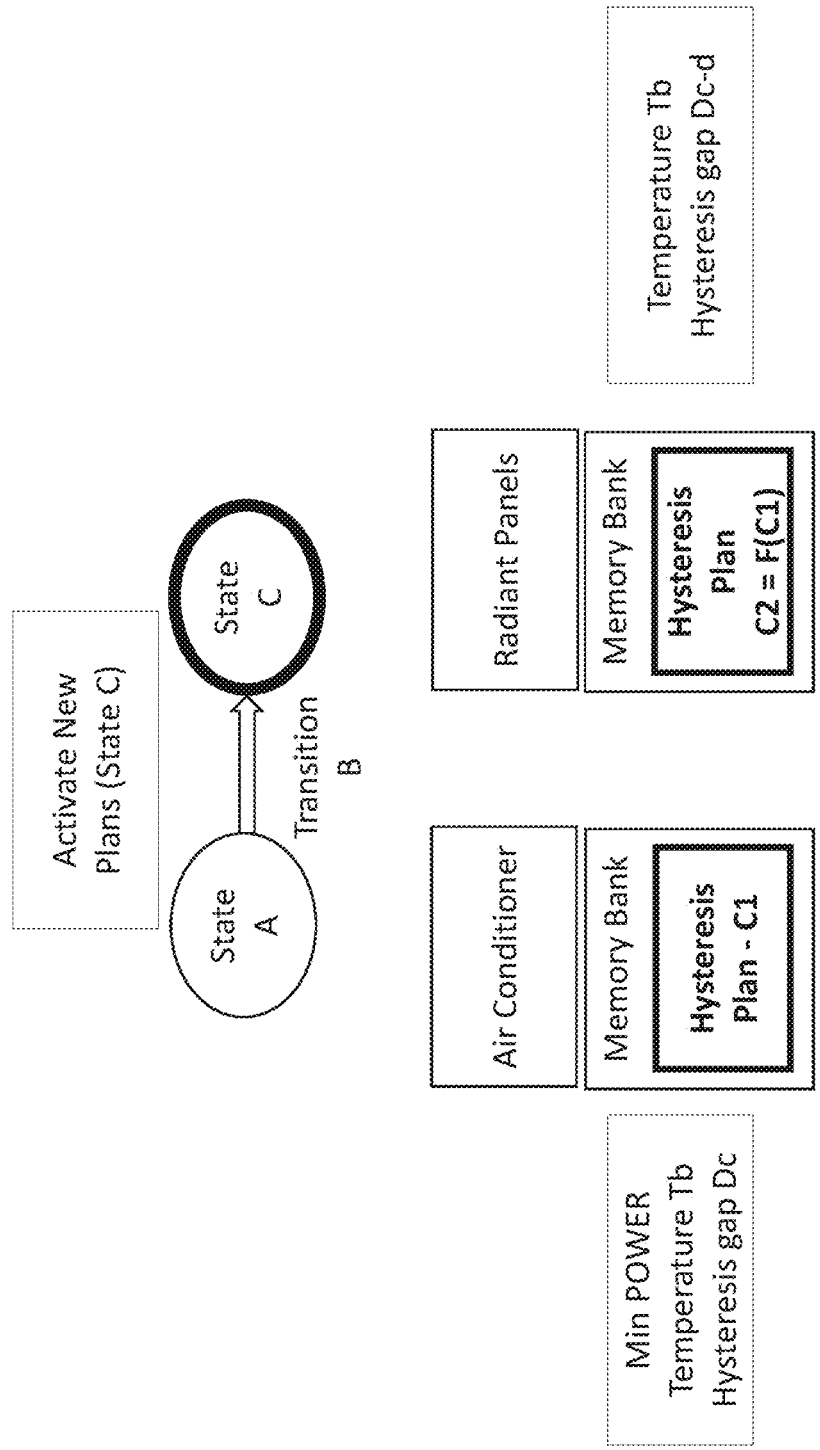

For example, consider again a climate control system with 2 climate control elements of which, as shown seen in FIG. 23, the first element is an air conditioner and the second element is a panelized radiant system. The system assumes 3 operative states; in State A, an off state, both elements are shut down. State C, suitable for winter conditions, is a state at which the climate control system is designed to maintain some warm temperature Tb. However, these states may not be sufficient for proper operation since the system may flit between State A and State C thus a different plan configuration is useful; thus as shown, between State A and State B there is an additional transition state, State B. From an end-user perspective, this state is completely transparent as the end-user may only sense the start and end states which may correspond to the starting conditions and the desired conditions respectively. In FIG. 23 State A is assumed to be an "OFF" state in which both elements are not operational. FIG. 24 assumes that the system has started the transition. The air condition system is programmed for maximum energy delivery conditions. The radiant system may only be turned on in this example and it is expected that the radiant based system may be slow to respond. The temperature and hysteresis gap settings of the radiant panel system may be derived from the air conditioner settings. In FIG. 25, the system has reached State C and the configuration is changed. The air conditioner system is put into a minimum power output mode with a wider hysteresis gap for allowing for the radiant system to perform most of the room heating preservation process. The radiant system plan may be derived from the air conditioner plan, with, say, same temperature, but smaller hysteresis gap.

While for simplicity, the actual controller is not shown in FIGS. 23-25, the controller typically exists and communicates the various plan settings to the climate control elements e.g. according to the controllers' own measurement/s and/or computation/s and/or external requests (e.g., from end users manipulating the controller's GUI).

More generally, regarding the transitions between states of climate control elements, it is appreciated that according to certain embodiments, at least one transition between states may itself be treated by the system as a state. Thus the system which operates plural HVAC devices or appliances may include control logic operative to selectably maintain each of at least two climate control states and to selectably transition between said at least two states. The climate control states may include, say, a cooling scenario, and/or a heating scenario, and/or a null scenario and/or a ventilation scenario. A first dedicated algorithm may be configured to maintain each of the climate control element states, and a second dedicated algorithm which differs from said first dedicated algorithm may be configured for transitioning between the states.

According to certain embodiments, the control logic, when transitioning from at least one of the two states to at least one other of said two states, commands at least one of the plural HVAC devices/systems to operate at a different (e.g. higher or lower) power level, than when said control logic is maintaining at least one of said two states.

According to certain embodiments, the control logic, when transitioning from at least a first state from among the two states to at least one other of said two states (aka second state), commands at least one of the plural HVAC devices/systems to operate at a different (e.g. higher or lower) power level, than when the control logic is transitioning between third and fourth states other than the first and second states. The first and third states are typically different; the second and fourth states are typically different.

Each algorithm may comprise a computer program measuring thermal related variable/s and may, e.g. accordingly, compute possible actions which relate to the climate control system. Switching between different algorithms means that either the "list" of variables which are measured are changed, and/or the computational formula and conditions, and/or actions (what the system may do and/or how much can the system do—for example, one algorithm may affect only air speed, and another only temperature settings. Another example—both algorithms may affect air speed, but the first one may only use air speed settings 1-3 on a given electrically controllable appliance, while the other one may only use settings 2-6 on the appliance).

At certain times the system may maintain or preserve a climate control element state, and at other times the system may transition between a current state to a new state. Typically, a first "algorithm" is used to maintain a certain state, and another "algorithm" is applied for the transition state (until the system reaches the new state). For example, consider state A which is a non-occupied house, during summer. This may mean that no systems are turned on, and this state is maintained, until a "trigger event" occurs, which indicates that the system is to prepare the house for tenants about to return home. The system may now shift to state B ("evening time", "full-occupancy", "summer"). During the shift from state A to state B, certain logic is applied (for example, full power convection activation, no radiant activation). When eventually state B is achieved, the above "logic" is replaced with other logic (for example, low power convection, max radiant cooling) having a purpose e.g. the main purpose of maintaining state B.

Any of the controllers shown and described herein may be configured for machine learning. For example, the controller might have a UI which allows users to suggest/demand the fixes they want ("too hot", "turn fan down" "worried about air quality/germs" etc.) and those inputs could be used for AI/ML. The UI may also prompt user to select from a menu of complaints in natural language, which may be assembled from end-user composed natural language complaints which the UI may also elicit. The UI may also send questions back to end-users e.g. if the end-user complains "too hot", the UI may send back: "which room/s is/are too hot" and provide a list of rooms which the end-user may select as being too hot.

Large building projects could provide, or offer home-purchasers as an option, a built-in set of climate control elements (perhaps a few possible sets (per apartment or per room) for each home-purchaser to pick from), plus a controller pre-programmed based on expert knowledge and/or pre-testing in an example apartment.

Thermal comfort may be operationalized as being a monotonically decreasing function of the number of complaints to the controller, per unit time e.g. per day or week. For example, if one home is generating zero complaints which suggest/demand fixes in operation of the climate control elements in that home, this may be deemed an indication that maximal thermal comfort (10 out of 10, say) has been achieved in that home. If another home is generating a number of complaints which suggest/demand fixes, falling within the top 10-percentile relative to other homes in the project, this may be deemed an indication that only the lowest level of thermal comfort (1 out of 10, say) has thus far been achieved in that home. If yet another home is generating a number of complaints which suggest/demand fixes, falling within the middle 10-percentile relative to other homes in the project, this may be deemed an indication that the $5^{th}$ level of thermal comfort (5 out of 10, say) has thus far been achieved in that home.

Figure 26:
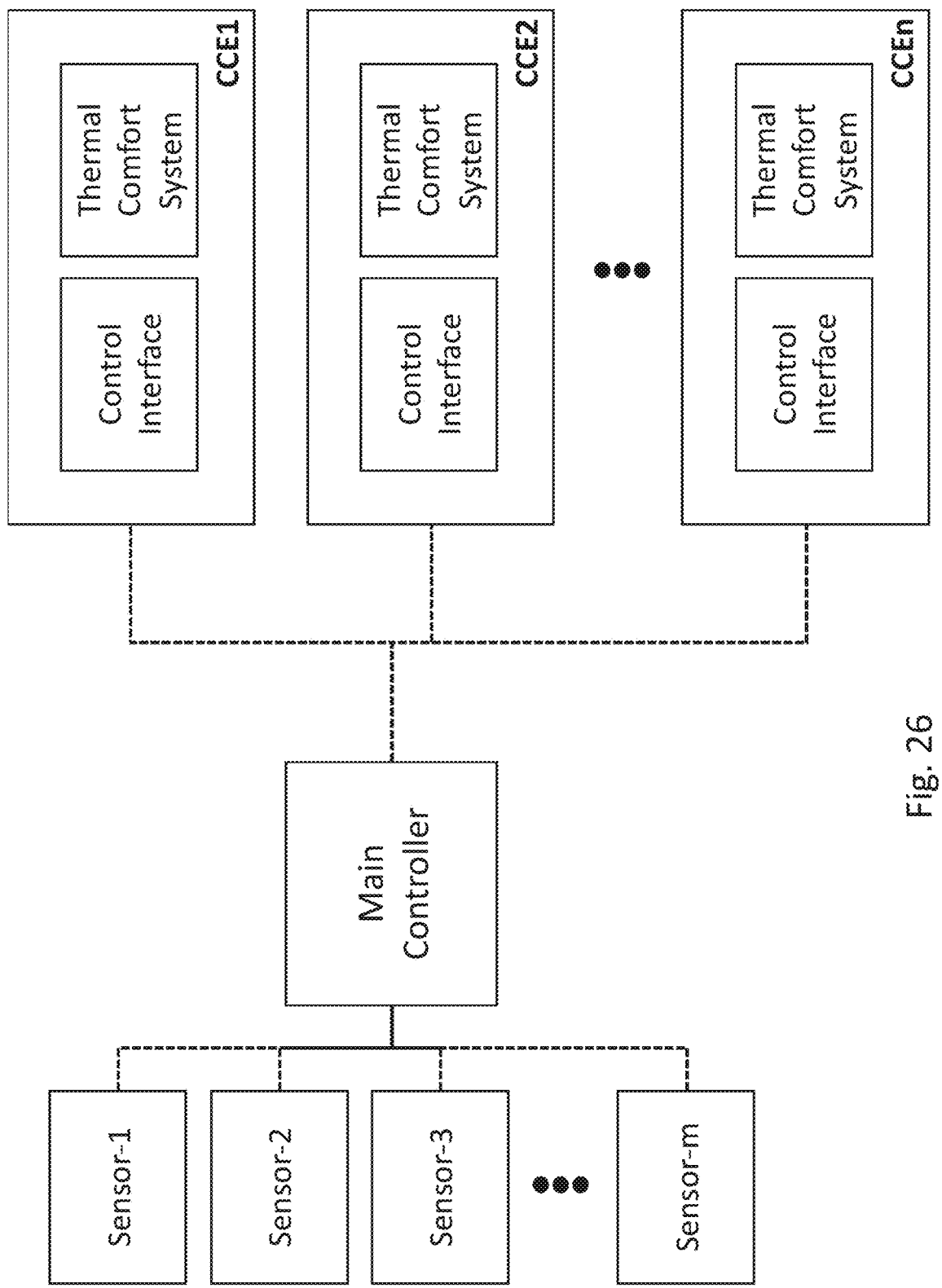
FIG. 26 is a simplified block diagram of an example CCS.

FIG. 26 illustrates an example control system including a central controller (described in detail in FIG. 27) communicates with various climate control elements (CCEs) and/or sensors via physical wirings and/or wirelessly. each CCE typically is electrically controllable hence includes control interface logic which communicates with the controller and a dedicated thermal comfort subsystem or appliance which operates for maintaining certain thermal comfort aspects and is governed by that logic. For example, in the case of an air conditioner for cooling an apartment, the thermal comfort system may include a heat pump, compressor based, whose operation reduces air temperature and relative humidity within the apartment. The CCE may include internal sensor/s and these sensors and their measurements may be available to the central controller through the control interface itself. A wired connection to the central controller may carry digital signals (e.g., on/off states) or analog signals (e.g., continuous and/or smooth level control). A wireless connection may employ any suitable technologies such as but not limited to Bluetooth, ZigBee, WiFi, Infrared.

Figure 27:
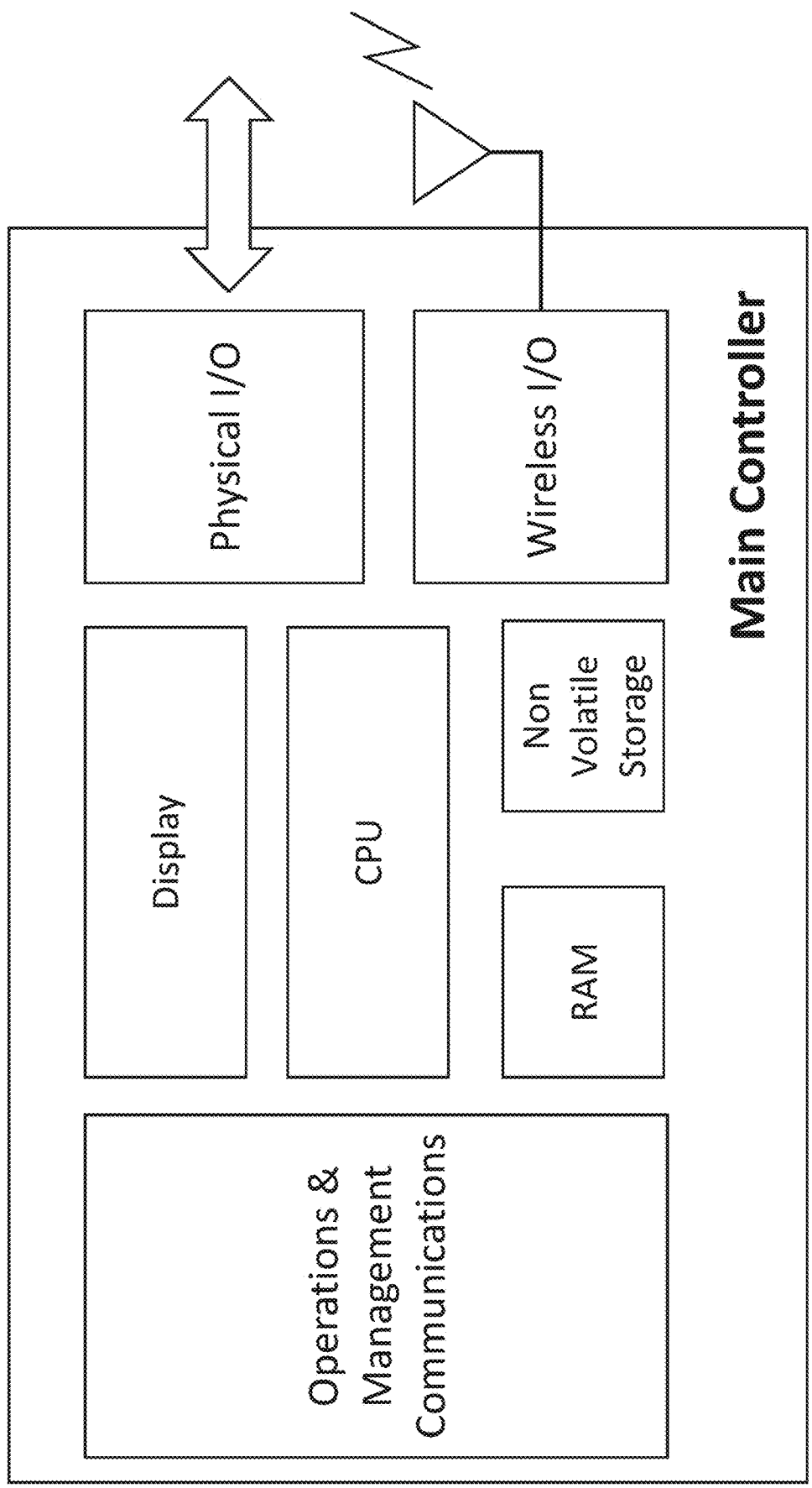
FIG. 27 is a simplified block diagram of an example controller.

FIG. 27 illustrates a central controller which may be used for any of the embodiments shown and described herein. The controller typically includes a CPU aka central processing unit, which is configured to process conditions e.g. if-logic and to compute any parameters required for system operation. The CPU typically uses RAM for its real time processing operations and a non volatile memory typically stores configuration files and baseline programs. A display may be provided for facilitating the process of communicating various status conditions of the control system and may comprise, for example, a touchscreen display to allow for external control. All operations and management functions may be performed by an operations and management unit as shown. The central controller may communicate with various CCEs and sensors described herein, whether via physical wired connections or wirelessly.

It is appreciated that embodiments herein are particularly useful in smart homes. For example, a controller aka smart home climate controller may be provided for each of (say) 100 smart homes (or a single controller for all 100 homes) built and/or maintained within a single project, where each home has plural types of elements, perhaps even in a single room e.g. a single room may have both an air conditioner and a radiator. Typically, each of the 100 homes has the same elements, identically positioned within the corresponding rooms of each of the 100 homes. For example, a single type of air conditioner may be installed on the wall facing the entrance, in all 100 homes. A single type of ceiling fan may be installed in each of the master bedrooms of the 100 homes. Thus the controller may be pre-programmed, including switchable hysteresis plans as described herein and/or including transitions between climate control element states e.g. as described herein, and then instances of that single controller may be used in all 100 (say) units thereby to yield climate control which is effective and dynamic, and yet parsimonious.

More generally, a climate control system may be provided which comprises:

Plural electrically controllable climate control elements including at least one instance of a first climate control element and at least one instance of a second climate control element; and a controller which controls the first and second elements to operate cooperatively, so as to enhance thermal comfort.

Controlling elements to operate cooperatively is intended to include processes for, at least once, constraining operation of 2 different climate control elements to avoid operation at cross-purposes, or to reduce operation at cross-purposes which would at least sometimes occur absent the constraining. For example, if hysteresis control is not cooperative, one climate control element may be attempting to reduce temperature, whereas another climate control element may be attempting to increase temperature, or one may be attempting to increase air pressure at a certain location or blow air in a certain direction, whereas another climate control element may be attempting to decrease air pressure at the same location or to blow air in the opposite direction. Controlling first and second elements to operate cooperatively is intended to include processes for, at least once, achieving, together, a thermal comfort effect which could not be achieved by each element alone or even by two instances of the first element or two instances of the second element.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device, or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order, including simultaneous performance of suitable groups of operations, as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently, rather than sequentially, as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a network—e.g. web-based system employing software, computers, routers and telecommunications equipment, as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities e.g. software functionalities shown and described herein may be deployed in a cloud environment. Clients, e.g. mobile communication devices such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false, and to perform y each time x is determined to be true, thereby to yield a processor which performs y at least once, typically on an "if and only if" basis e.g. triggered only by determinations that x is true, and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may, for example, comprise changing the state or condition, or may more generally cause any outcome which is technically advantageous given the state or condition or data, and/or may prevent at least one outcome which is disadvantageous given the state or condition or data. Alternatively or in addition, an alert may be provided to an appropriate human operator, or to an appropriate external system.

Features of the present invention, including operations, which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order, may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments, or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example and, instead, embodiments of the present invention may be implemented, say, as a smartphone SDK, as a hardware component, as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.) or may be conventionally tethered to a networked device (to a device which is a node in a conventional communication network or is tethered directly or indirectly/ultimately to such a node).

Any operation or characteristic described herein may be performed by another actor outside the scope of the patent application and the description is intended to include apparatus whether hardware, firmware or software which is configured to perform, enable or facilitate that operation or to enable, facilitate or provide that characteristic.

The terms processor or controller or module or logic as used herein are intended to include hardware such as computer microprocessors or hardware processors, which typically have digital memory and processing capacity, such as those available from, say Intel and Advanced Micro Devices (AMD). Any operation or functionality or computation or logic described herein may be implemented entirely or in any part on any suitable circuitry including any such computer microprocessor/s as well as in firmware or in hardware or any combination thereof.

It is appreciated that elements illustrated in more than one drawing, and/or elements in the written description, may still be combined into a single embodiment, except if otherwise specifically clarified herewithin. Any of the systems shown and described herein may be used to implement or may be combined with, any of the operations or methods shown and described herein.

It is appreciated that any features, properties, logic, modules, blocks, operations or functionalities described herein, which are, for clarity, described in the context of separate embodiments, may also be provided in combination in a single embodiment, except where the specification or general knowledge specifically indicates that certain teachings are mutually contradictory, and cannot be combined. Any of the systems shown and described herein may be used to implement or may be combined with, any of the operations or methods shown and described herein.

Conversely, any modules, blocks, operations or functionalities described herein, which are, for brevity, described in the context of a single embodiment, may also be provided separately or in any suitable sub-combination, including with features known in the art. Each element e.g. operation described herein may have all characteristics and attributes described or illustrated herein or according to other embodiments, may have any subset of the characteristics or attributes described herein.

The invention claimed is:

1. A controller apparatus operative in conjunction with a climate control system including at least first and second climate control elements, the controller apparatus comprising:
   a hardware processor providing hysteresis coupling between at least said first and second climate control elements, including providing at least one first hysteresis plan controlling the first climate control element, and at least one second hysteresis plan controlling the second climate control element and wherein said first and second hysteresis plans each have a plurality of parameters; and coupling at least one parameter of the plurality of parameters of the second hysteresis plan to at least one parameter of the plurality of parameters of the first hysteresis plan by computing said at least one parameter of the second hysteresis plan as a function of the at least one parameter of the first hysteresis plan,
   wherein the plurality of parameters of the first and second hysteresis plans each include the parameters: (x, s, P0, P1), where x is a sensed, measured or computed climate aspect, s is an internal hysteresis plan state, P0 is a program controlling a climate control element which is activated when s=0, and P1 is a program controlling the climate control element which is activated when s=1.

2. The controller apparatus according to claim 1 wherein the said first and second hysteresis plans each have at least one hysteresis parameter.

3. The controller apparatus according to claim 1, wherein the at least one hysteresis parameter of the first hysteresis plan, the second hysteresis plan, or both includes at least one of: a threshold center, an upper threshold, a lower threshold, at least one hysteresis gap parameter between the threshold center and at least one of an upper threshold and a lower threshold.

4. The controller apparatus according to claim 1, wherein x comprises a measurement generated by a single sensor.

5. The controller apparatus according to claim 1, wherein x comprises a combination of plural sensor measurements of at least one climate aspect at at least one time.

6. The controller apparatus according to claim 1, wherein the hardware processor is configured for detection of inefficiency of a current hysteresis program that is currently governing operation of a given climate control element and wherein, on at least one occasion in which inefficiency is detected, at least one of said first and second hysteresis plans is replaced by at least one new hysteresis plan, thereby modifying the current hysteresis program that is currently governing operation of the given climate control element.

7. The controller apparatus according to claim 6, wherein the at least one new hysteresis plan is coupled to at least one parameter of a hysteresis plan currently governing operation of a climate control element other than the given climate control element.

8. The controller apparatus according to claim 6, wherein said detection of inefficiency comprises detection of inability to maintain a target goal for at least one climate aspect.

9. The controller apparatus according to claim 8, wherein said target goal for at least one climate aspect comprises a target temperature and/or target humidity and/or target air pressure that are to be maintained.

10. The controller apparatus according to claim 6, wherein at least one decision to replace a hysteresis plan with a new plan is made responsive to one or more measurements of a duty cycle.

11. The controller apparatus according to claim 6, wherein at least one decision to replace a hysteresis plan with a new plan is made responsive to one or more measurements of one or more cycle times.

12. The controller apparatus according to claim 1, wherein at least one thermal comfort physical aspect is maintained by providing synchronization between at least a subset of plural climate control elements which affect said at least one thermal comfort physical aspect.

13. The controller apparatus according to claim 12, wherein said at least one thermal comfort physical aspect to be maintained comprises net zero air pressure over plural spaces between which air flows when the subset of plural climate control elements operate.

14. The controller apparatus according to claim 12, wherein at least one of said first and second hysteresis plans provides said synchronization.

15. A method for controlling a climate control system including at least first and second climate control elements, the method comprising:
providing a hardware processor which provides hysteresis coupling between at least said first and second climate control elements, including providing at least one first hysteresis plan controlling the first climate control element, and at least one second hysteresis plan controlling the second climate control element and wherein said first and second hysteresis plans each have a plurality of parameters and coupling at least one parameter of the plurality of parameters of the second hysteresis plan to at least one parameter of the plurality of parameters of the first hysteresis plan by computing said at least one parameter of the second hysteresis plan as a function of the at least one parameter of the first hysteresis plan,
wherein the plurality of parameters of the first and second hysteresis plans each include the parameters: (x, s, P0, P1), where x is a sensed, measured or computed climate aspect, s is an internal hysteresis plan state, P0 is a program controlling a climate control element which is activated when s=0, and P1 is a program controlling the climate control element which is activated when s=1.

16. A computer program product, comprising a non-transitory tangible computer readable medium having computer readable program code embodied therein, said computer readable program code adapted to be executed to implement a method for controlling a climate control system including at least first and second climate control elements, the method comprising:
providing a hardware processor which provides hysteresis coupling between at least said first and second climate control elements, including providing at least one first hysteresis plan controlling the first climate control element, and at least one second hysteresis plan controlling the second climate control element and wherein said first and second hysteresis plans each have a plurality of parameters; and coupling at least one parameter of the plurality of parameters of the second hysteresis plan to at least one parameter of the plurality of parameters of the first hysteresis plan by computing said at least one parameter of the second hysteresis plan as a function of the at least one parameter of the first hysteresis plan,
wherein the plurality of parameters of the first and second hysteresis plans each include the parameters: (x, s, P0, P1), where x is a sensed, measured or computed climate aspect, s is an internal hysteresis plan state, P0 is a program controlling a climate control element which is activated when s=0, and P1 is a program controlling the climate control element which is activated when s=1.

* * * * *